US012606712B2

(12) United States Patent 
Gogotsi et al.

(10) Patent No.: US 12,606,712 B2 
(45) Date of Patent: Apr. 21, 2026

(54) MXENE COMPOSITIONS FEATURING FIVE ATOMIC LAYERS

(71) Applicant: Drexel University, Philadelphia, PA (US)

(72) Inventors: Yury Gogotsi, Warminster, PA (US); Christopher Eugene Shuck, Philadelphia, PA (US); Babak Anasori, Fishers, IN (US); Grayson Brouse Deysher, San Diego, CA (US)

(73) Assignee: Drexel University, Philadelphia, PA (US)

( * ) Notice: Subject to any disclaimer, the term of this patent is extended or adjusted under 35 U.S.C. 154(b) by 961 days.

(21) Appl. No.: 17/767,083

(22) PCT Filed: Oct. 9, 2020

(86) PCT No.: PCT/US2020/054912
§ 371 (c)(1),
(2) Date: Apr. 7, 2022

(87) PCT Pub. No.: WO2021/072150
PCT Pub. Date: Apr. 15, 2021

(65) Prior Publication Data
US 2022/0363916 A1 Nov. 17, 2022

Related U.S. Application Data

(60) Provisional application No. 62/913,866, filed on Oct. 11, 2019.

(51) Int. Cl.
*C09D 5/24* (2006.01)
*C09D 1/00* (2006.01)

(52) U.S. Cl.
CPC .................................. *C09D 5/24* (2013.01); *C09D 1/00* (2013.01)

(58) Field of Classification Search
None
See application file for complete search history.

(56) References Cited

U.S. PATENT DOCUMENTS 9,837,182 B2 12/2017 Barsoum et al.
2018/0108910 A1 4/2018 Barsoum et al.

FOREIGN PATENT DOCUMENTS

CN 108275683 A 7/2018
WO 2017/044262 A1 3/2017

OTHER PUBLICATIONS

Khazaei et al, insights into exfoliation possibility of MAX phases to MXenes, Phys. Chem. Chem. Phys. 20, pp. 8579-8592 (Year: 2018).*

(Continued)

*Primary Examiner* — Stefanie J Cohen
(74) *Attorney, Agent, or Firm* — BakerHostetler

(57) ABSTRACT

Provided are 5-layered MXene materials having the formulas $M_5X_4T_x$; $(M'aM''b)X_4T_x$ (where a+b=5); and $(M'_aM''_b)_5X_4T_x$ (where a+b=1). Also provided are related methods, compositions, and applications.

18 Claims, 23 Drawing Sheets

(56) References Cited

OTHER PUBLICATIONS

Hadi et al, New ternary nanolaminated carbide Mo2Ga2C: A first-principles comparison with the MAX phase counterpart Mo2GaC, computational materials science, 117, 422-427 (Year: 2016).*

Eklund et al, Layered ternary Mn+1AXn phases and their 2D derivative MXene: an overview from a thin-film perspective, J Phys D: Appl. Phys, 50, 113001 (Year: 2017).*

Sang et al, in situ atomistic insight into the growth mechanisms of single layer 2D transition metal carbides, nature communications, 9:2266 (Year: 2018).*

Abdelmalak et al., "A New Family of Two-Dimensional Materials and its Application as Electrodes for Li-ion Batteries", Drexel University, 2014.

Alhabeb et al., "Guidelines for Synthesis and Processing of Two-Dimensional Titanium Carbide (Ti3C2T x MXene)", Chemistry of Materials, 2017, 29 (18), 7633-7644.

Alhabeb et al., "Selective etching of silicon from Ti3SIC2 (MAX) to obtain 2D titanium carbide (MXene)", Angewandte Chemie International Edition, 2018, 57 (19), 5444-5448.

Anasori et al., "2D metal carbides and nitrides (MXenes) for energy storage", Nature Reviews Materials, 2017, 2 (2), 16098.

Anasori et al., "Control of electronic properties of 2D carbides (MXenes) by manipulating their transition metal layers", Nanoscale Horizons, 2016, 1 (3), 227-234.

Anasori et al., "Two-dimensional, ordered, double transition metals carbides (MXenes)", ACS Nano, 2015, 9 (10), 9507-9516.

Ashton et al., "Computational discovery of stable M 2 A X phases", Physical Review B, 2016, 94(5), 054116.

Barsoum et al., "Synthesis and Characterization of a Remarkable Ceramic: The Ti3SIC2", J. Ameri. Ceramics Soc., 1996, 79, 1953-1956.

Barsoum, "The MN+1AXn Phases: A New Class of Solids: Thermodynamically Stable Nanolaminates", Progress in Solid State Chemistry, 2000, 28, 201-281.

Bonaccorso et al., "Graphene photonics and optoelectronics", Nature photonics, 2010, 4(9), 611.

Dahlqvist et al., "Stability trends of M A X phases from first principles", Physical Review B, 2010, 81(22), 220102.

Dillon et al., "Highly conductive optical quality solution-processed films of 2D titanium carbide", Advanced Functional Materials, 2016, 26(23), 4162-4168.

Etzkorn et al., V2AIC, V4AIC3-x (x⁻ 0.31), and V12AI3C8: synthesis, crystal growth, structure, and superstructure, Inorganic chemistry. 2007, 46(18), 7646-7653.

Frey et al., "Prediction of Synthesis of 2D Metal Carbides and Nitrides (MXenes) and Their Precursors with Positive and Unlabeled Machine Learning", ACS Nano, 2019.

Gao et al., "2D MXenes: a new family of promising catalysts for the hydrogen evolution reaction", ACS Catalysis, 2016, 7(1), 494-500.

Ghidiu et al., "Synthesis and characterization of two-dimensional Nb 4 C 3 (MXene)", Chemical Communications, 2014, 50(67), 9517-9520.

Gouadec et al., "Raman Spectroscopy of nanomaterials: How spectra relate to disorder, particle size and mechanical properties", Progress in crystal growth and characterization of materials, 2007, 53(1), 1-56.

Halim et al., "Synthesis and characterization of 2D molybdenum carbide (MXene)", Advanced Functional Materials, 2016, 26(18), 3118-3127.

Halim et al., "Synthesis of Two-Dimensional Nb1. 33C (MXene) with Randomly Distributed Vacancies by Etching of the Quaternary Solid Solution (Nb2/3Sc1/3) 2AIC Max Phase", ACS Applied Nano Materials, 2018, 1(6), 2455-2460.

Halim et al., "X-ray photoelectron spectroscopy of select multi-layered transition metal carbides (MXenes)", Applied Surface Science, 2016, 362, 406-417.

Han et al., "Anisotropic MXene Aerogels with a Mechanically Tunable Ratio of Electromagnetic Wave Reflection to Absorption", Advanced Optical Materials, 2019, 1900267.

Hantanasirisakul et al., "Effects of Synthesis and Processing on Optoelectronic Properties of Titanium Carbonitride MXene", Chemistry of Materials, 2019.

Hantanasirisakul et al., "Electronic and optical properties of 2D transition metal carbides and nitrides (MXenes)", Advanced Materials, 2018, 30(52), 1804779.

Hantanasirisakul et al., "Fabrication of Ti3C2Tx MXene transparent thin films with tunable optoelectronic properties", Advanced Electronic Materials, 2016, 2(6), 1600050.

Hart et al., "Control of MXenes' electronic properties through termination and intercalation", Nature communications, 2019, 10(1), 522.

Huang et al., "Two-dimensional transition metal carbides and nitrides (MXenes) for biomedical applications", Chemical Society Reviews, 2018, 47(14), 5109-5124.

Kasap, "Principles of electronic materials and devices", McGraw-Hill New York, 2006, vol. 2.

Khazaei et al., "Insights into exfoliation possibility of MAX phases to MXenes", Physical Chemistry Chemical Physics, 2018, 20(13), 8579-8592.

Kim et al., "Metallic Ti3C2T x MXene gas sensors with ultrahigh signal-to-noise ratio", ACS Nano, 2018, 12(2), 986-993.

Kim et al., "Thermoelectric Properties of Two-Dimensional Molybdenum-Based MXenes", Chemistry of Materials, 2017, 29(15), 6472-6479.

Kresse et al., "Efficient iterative schemes for ab initio total-energy calculations using a plane-wave basis set", Physical review B, 1996, 54(16), 11169.

Kresse et al., "From ultrasoft pseudopotentials to the projector augmented-wave method", Physical Review B, 1999, 59(3), 1758.

Kurtoglu et al., "First principles study of two-dimensional early transition metal carbides", Mrs Commun, 2012, 2(4), 133-137.

Lin et al., "Microstructures and theoretical bulk modulus of layered ternary tantalum aluminum carbides", Journal of the American Ceramic Society, 2006, 89(12), 3765-3769.

Lin et al., "Structural characterization of a new layered-ternary Ta 4 AIC 3 ceramic", Journal of materials research, 2006, 21 (10), 2587-2592.

Lipatov et al., "Elastic properties of 2D Ti3C2Tx MXene monolayers and bilayers", Science Advances, 2018, 4(6), eaat0491.

Lukatskaya et al., "Cation intercalation and high volumetric capacitance of two-dimensional titanium carbide", Science, 2013, 341(6153), 1502-1505.

Meshkian, R.; Dahlqvist, M.; Lu, J.; Wickman, B.; Halim, J.; Thörnberg, J.; Tao, Q.; Li, S.; Intikhab, S.; Snyder, J., W-Based Atomic Laminates and Their 2D Derivative W1. 33C MXene with Vacancy Ordering. Advanced Materials 2018, 30 (21), 1706409.

Meshkian, R.; Naslund, L.-Å.; Halim, J.; Lu, J.; Barsoum, M. W.; Rosen, J., Synthesis of two-dimensional molybdenum carbide, Mo2C, from the gallium based atomic laminate Mo2Ga2C. Scripta Materialia 2015, 108, 147-150.

Meshkian, R.; Tao, Q.; Dahlqvist, M.; Lu, J.; Hultman, L.; Rosen, J., Theoretical stability and materials synthesis of a chemically ordered MAX phase, Mo2ScAIC2, and its two-dimensional derivate Mo2ScC2 MXene. Acta Materialia 2017, 125, 476-480.

Naguib, M.; Halim, J.; Lu, J.; Cook, K. M.; Hultman, L.; Gogotsi, Y.; Barsoum, M. W., New two-dimensional niobium and vanadium carbides as promising materials for Li-ion batteries. Journal of the American Chemical Society 2013, 135 (43), 15966-15969.

Naguib, M.; Kurtoglu, M.; Presser, V.; Lu, J.; Niu, J. J.; Heon, M.; Hultman, L.; Gogotsi, Y.; Barsoum, M. W., Two-Dimensional Nanocrystals Produced by Exfoliation of Ti3AIC2. Advanced Materials 2011, 23 (37), 4248-4253.

Naguib, M.; Mashtalir, O.; Carle, J.; Presser, V.; Lu, J.; Hultman, L.; Gogotsi, Y.; Barsoum, M. W., Two-dimensional transition metal carbides. ACS nano 2012, 6 (2), 1322-1331.

Naguib, M.; Unocic, R. R.; Armstrong, B. L.; Nanda, J., Large-scale delamination of multi-layers transition metal carbides and carbonitrides "MXenes". Dalton transactions 2015, 44 (20), 9353-9358.

Ouisse, T.; Barsoum, M. W., Magnetotransport in the MAX phases and their 2D derivatives: MXenes. Materials Research Letters 2017, 5 (6), 365-378.

(56) References Cited

OTHER PUBLICATIONS

Perdew, J. P.; Burke, K.; Ernzerhof, M., Generalized gradient approximation made simple. Physical review letters 1996, 77 (18), 3865.

Persson, I.; El Ghazaly, A.; Tao, Q.; Halim, J.; Kota, S.; Darakchieva, V.; Palisaitis, J.; Barsoum, M. W.; Rosen, J.; Persson, P. O., Tailoring Structure, Composition, and Energy Storage Properties of MXenes from Selective Etching of In-Plane, Chemically Ordered MAX Phases. Small 2018, 14 (17), 1703676.

Ran, J.; Gao, G.; Li, F.-T.; Ma, T.-Y.; Du, A.; Qiao, S.-Z., Ti 3 C 2 MXene co-catalyst on metal sulfide photo-absorbers for enhanced visible-light photocatalytic hydrogen production. Nature communications Aug. 2017, 13907.

Salles, P.; Pinto, D.; Hantanasirisakul, K.; Maleski, K.; Shuck, C. E.; Gogotsi, Y., Electrochromic Effect in Titanium Carbide MXene Thin Films Produced by Dip-Coating. Advanced Functional Materials 2019, 29 (17), 1809223.

Sarycheva, A.; Polemi, A.; Liu, Y.; Dandekar, K.; Anasori, B.; Gogotsi, Y., 2D titanium carbide (MXene) for wireless communication. Science advances 2018, 4 (9), eaau0920.

Seh, Z. W.; Fredrickson, K. D.; Anasori, B.; Kibsgaard, J.; Strickler, A. L.; Lukatskaya, M. R.; Gogotsi, Y.; Jaramillo, T. F.; Vojvodic, A., Two-dimensional molybdenum carbide (MXene) as an efficient electrocatalyst for hydrogen evolution. ACS Energy Letters 2016, 1 (3), 589-594.

Seredych, M.; Shuck, C. E.; Pinto, D.; Alhabeb, M.; Precetti, E.; Deysher, G.; Anasori, B.; Kurra, N.; Gogotsi, Y., High-Temperature Behavior and Surface Chemistry of Carbide MXenes Studied by Thermal Analysis. Chemistry of Materials 2019.

Shahzad, F.; Alhabeb, M.; Hatter, C. B.; Anasori, B.; Hong, S. M.; Koo, C. M.; Gogotsi, Y., Electromagnetic interference shielding with 2D transition metal carbides (MXenes). Science 2016, 353 (6304), 1137-1140.

Shao, Y.; Wang, J.; Wu, H.; Liu, J.; Aksay, I. A.; Lin, Y., Graphene based electrochemical sensors and biosensors: a review. Electroanalysis: An International Journal Devoted to Fundamental and Practical Aspects of Electroanalysis 2010, 22 (10), 1027-1036.

Soundiraraju, B.; George, B. K., Two-Dimensional Titanium Nitride (Ti2N) MXene: Synthesis, Characterization, and Potential Application as Surface-Enhanced Raman Scattering Substrate. ACS nano 2017, 11 (9), 8892-8900.

Tan, T. L.; Jin, H. M.; Sullivan, M. B.; Anasori, B.; Gogotsi, Y., High-throughput survey of ordering configurations in MXene alloys across compositions and temperatures. ACS nano 2017, 11 (5), 4407-4418.

Tao, Q.; Dahlqvist, M.; Lu, J.; Kota, S.; Meshkian, R.; Halim, J.; Palisaitis, J.; Hultman, L.; Barsoum, M. W.; Persson, P. O., Two-dimensional Mo 1.33 C MXene with divacancy ordering prepared from parent 3D laminate with in-plane chemical ordering. Nature communications Aug. 2017, 14949.

Tran et al., Adding a New Member to the MXene Family: Synthesis, Structure, and Electrocatalytic Activity for the Hydrogen Evolution Reaction of V4C3T x. ACS Applied Energy Materials 2018, 1 (8), 3908-3914.

Tzenov, N. V.; Barsoum, M. W., Synthesis and characterization of Ti3AlC2. Journal of the American Ceramic Society 2000, 83 (4), 825-832.

Urbankowski, P.; Anasori, B.; Hantanasirisakul, K.; Yang, L.; Zhang, L.; Haines, B.; May, S. J.; Billinge, S. J.; Gogotsi, Y., 2D molybdenum and vanadium nitrides synthesized by ammoniation of 2D transition metal carbides (MXenes). Nanoscale 2017, 9 (45), 17722-17730.

Urbankowski, P.; Anasori, B.; Makaryan, T.; Er, D.; Kota, S.; Walsh, P. L.; Zhao, M.; Shenoy, V. B.; Barsoum, M. W.; Gogotsi, Y., Synthesis of two-dimensional titanium nitride Ti 4 N 3 (MXene). Nanoscale 2016, 8 (22), 11385-11391.

Wang, Q. H.; Kalantar-Zadeh, K.; Kis, A.; Coleman, J. N.; Strano, M. S., Electronics and optoelectronics of two-dimensional transition metal dichalcogenides. Nature nanotechnology 2012, 7 (11), 699.

Watanabe, K.; Taniguchi, T.; Kanda, H., Direct-bandgap properties and evidence for ultraviolet lasing of hexagonal boron nitride single crystal. Nature materials 2004, 3 (6), 404.

Xie, Y.; Kent, P., Hybrid density functional study of structural and electronic properties of functionalized Ti n+ 1 X n (X=C, N) monolayers. Physical Review B 2013, 87 (23), 235441.

Yang, J.; Naguib, M.; Ghidiu, M.; Pan, L. M.; Gu, J.; Nanda, J.; Halim, J.; Gogotsi, Y.; Barsoum, M. W., Two-Dimensional Nb-Based M4C3 Solid Solutions (MXenes). Journal of the American Ceramic Society 2016, 99 (2), 660-666.

Yang, S.; Evmiridis, N., Synthesis of omega zeolite without use of tetramethylammonium (TMA) ions. In Studies in Surface Science and Catalysis, Elsevier: 1994; vol. 84, pp. 155-162.

Ying, G.; Kota, S.; Dillon, A. D.; Fafarman, A. T.; Barsoum, M. W., Conductive transparent V2CTx (MXene) films. FlatChem Aug. 25-30, 2018.

Zhang, J.; Liu, B.; Wang, J.; Zhou, Y., Low-temperature instability of Ti 2 SnC: A combined transmission electron microscopy, differential scanning calorimetry, and X-ray diffraction investigations. Journal of Materials Research 2009, 24 (1), 39-49.

Zheng, L.; Wang, J.; Lu, X.; Li, F.; Wang, J.; Zhou, Y., (Ti0. 5Nb0. 5) 5AlC4: A New-Layered Compound Belonging to MAX Phases. Journal of the American Ceramic Society 2010, 93 (10), 3068-3071.

Zhou, J.; Zha, X.; Chen, F. Y.; Ye, Q.; Eklund, P.; Du, S.; Huang, Q., A Two-Dimensional Zirconium Carbide by Selective Etching of Al3C3 from Nanolaminated Zr3Al3C5. Angewandte Chemie 2016, 128 (16), 5092-5097.

Zhou, J.; Zha, X.; Zhou, X.; Chen, F.; Gao, G.; Wang, S.; Shen, C.; Chen, T.; Zhi, C.; Eklund, P., Synthesis and electrochemical properties of two-dimensional hafnium carbide. ACS nano 2017, 11 (4), 3841-3850.

Zhou, Y.; Sun, Z., Electronic structure and bonding properties of layered machinable Ti 2 AlC and Ti 2 AlN ceramics. Physical Review B 2000, 61 (19), 12570.

* cited by examiner

MXENE COMPOSITIONS FEATURING FIVE ATOMIC LAYERS

CROSS-REFERENCE TO RELATED APPLICATIONS

The present application is the National Stage Application of International Patent Application No. PCT/US2020/054912 (filed Oct. 9, 2020), which claims priority to and the benefit of U.S. patent application No. 62/913,866, "MXene Compositions Featuring Five Atomic Layers" (filed Oct. 11, 2019), which application is incorporated herein by reference in its entirety for any and all purposes.

TECHNICAL FIELD

The present disclosure relates to the field of MXene materials.

BACKGROUND

Two-dimensional (2D) materials such as graphene, hexagonal boron nitride, and transition metal dichalcogenides have gained significant attention due to their unique electronic, photonic, electrochemical, and optical properties. The 2D nature of these materials allows for novel applications compared to their bulk counterparts such as transistors, solar cells, touch screens, biosensors, and lasers. With the increasing demands placed on these technologies comes a need for materials having improved performance that can support these demands.

SUMMARY

In meeting the described long-felt needs, the present disclosure first provides compositions, comprising:
- (a) at least one layer having first and second surfaces, each layer described by a formula $M_5X_4T_x$ and comprising a substantially two-dimensional array of crystal cells, each crystal cell having an empirical formula of $M_5X_4$, such that each X is positioned within an octahedral array of M,
  wherein M is at least one Group IIIB, IVB, VB, or VIB metal or a lanthanide,
  wherein X is C and/or N, and
  wherein $T_x$ represents optionally present surface termination groups; or
- (b) at least one layer having first and second surfaces, each layer described by a formula $(M'_aM''_b)X_4T_x$ and comprising a substantially two-dimensional array of crystal cells, each crystal cell having an empirical formula of $(M'_aM''_b)X_4$, such that each X is positioned within an octahedral array of M' and M'',
  wherein M' and M'' are different Group IIIB, IVB, VB, or VIB metals,
  wherein a+b=5,
  wherein X is C and/or N, and
  wherein $T_x$ represents optionally present surface termination groups, or
- (c) at least one layer having first and second surfaces, each layer described by a formula $(M'_aM''_b)_5X_4T_x$ and comprising a substantially two-dimensional array of crystal cells, each crystal cell having an empirical formula of $(M'_aM''_b)_5X_4$, such that each X is positioned within an octahedral array of M' and M'', wherein M' and M'' are different Group IIIB, IVB, VB, or VIB metals,
  wherein X is C and/or N,
  wherein a+b=1, and
  wherein $T_x$ represents optionally present surface termination groups.

The present disclosure also provides compositions, comprising: a layer comprising a substantially two-dimensional array of crystal cells, the layer having a first surface and a second surface, each crystal cell having an empirical formula of $M_5X4(T_s)$, such that each X is positioned within an array of M, wherein M is at least one Group IIIB, IVB, VB, or VIB metal or a lanthanide, wherein X is C, N, or a combination thereof, wherein at least one of the first surface and the second surface comprises surface terminations $T_s$, the surface terminations independently comprising alkoxide, alkyl, carboxylate, halide, hydroxide, hydride, oxide, sub-oxide, nitride, sub-nitride, sulfonate, thiol, or any combination thereof.

Additionally provided are components, the components having disposed thereon a coating, the coating comprising a composition according to the present disclosure.

Also provided are compositions, the composition comprising a suspension of a composition according to the present disclosure.

Further provided are methods, the method comprising synthesizing a composition according to the present disclosure.

Additionally disclosed are methods, comprising removing the A-group element from a MAX phase material so as to form a product composition having the empirical formula of a composition disclosed herein, e.g., $M_5X_4$, $M_5X_4(T_x)$, $(M'_aM''_b)AX_4$, $(M'_aM''_b)AX_4(T_x)$ (where a+b=5), $(M'_aM''_b)_5 AX_4$, or $(M'_aM''_b)_5AX_4(T_x)$ (where a+b=1).
Further provided are compositions,
- (a) the composition characterized as having an empirical formula $M_5AX_4$, wherein M is a Group IIIB, IVB, VB, or VIB metal, and wherein X is C and/or N; or
- (b) the composition characterized as having an empirical formula $(M'_aM''_b)AX_4$, wherein M' and M'' are different Group IIIB, IVB, VB, or VIB metals, wherein a+b=5, and wherein X is C and/or N, or
- (c) the composition characterized as having an empirical formula $(M'_aM''_b)_5AX_4$, wherein M' and M'' are different Group IIIB, IVB, VB, or VIB metals, wherein a+b=1, and wherein X is C and/or N.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document. In the drawings.

DETAILED DESCRIPTION OF ILLUSTRATIVE EMBODIMENTS

Figure 1:
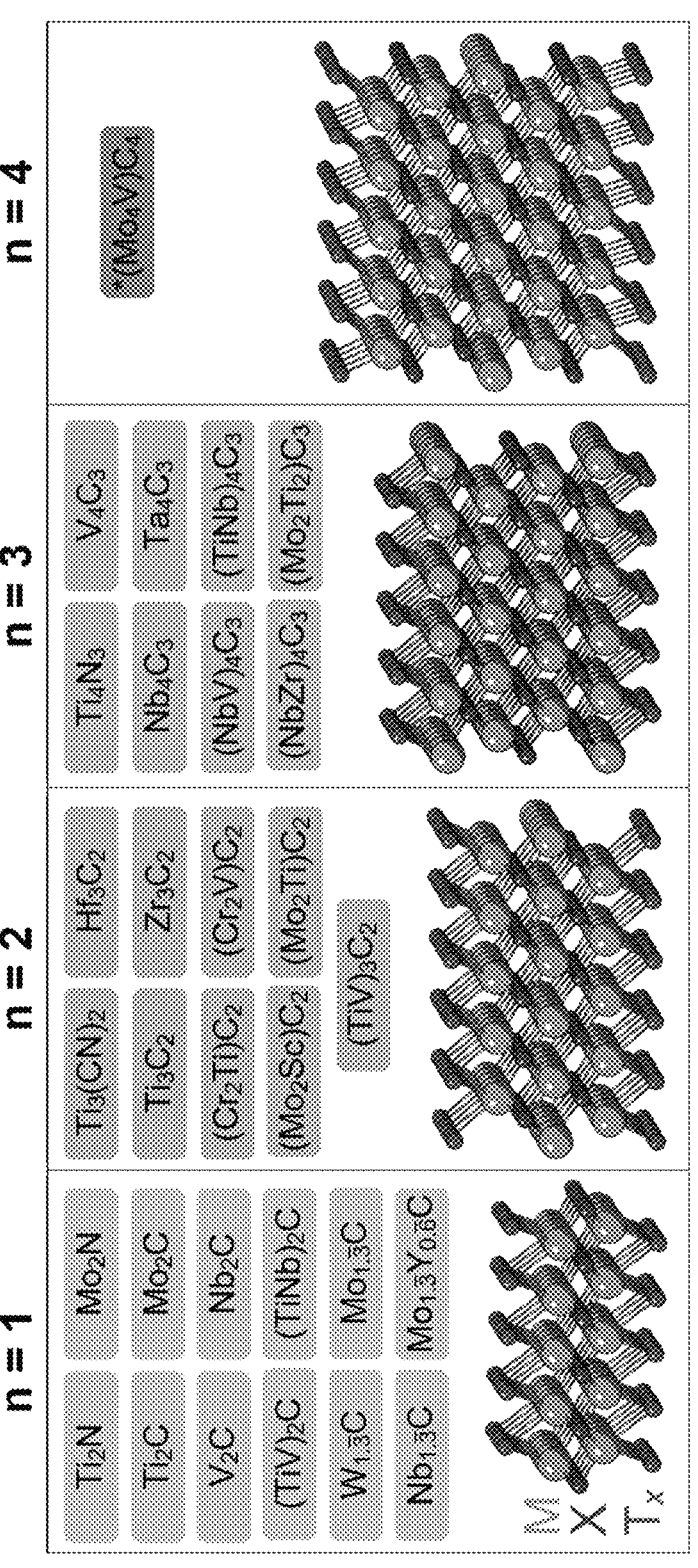
FIG. 1. Exemplary MXenes synthesized to date. Twelve $M_2X$ MXenes (n=1), nine $M_3X_2$ (n=2) and eight $M_4X_3$ (n=3) have been synthesized. The MXene reported here is marked by an *.

The present disclosure may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention.

Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable, and it should be understood that steps may be performed in any order.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. All documents cited herein are incorporated herein in their entireties for any and all purposes.

Further, reference to values stated in ranges include each and every value within that range. In addition, the term "comprising" should be understood as having its standard, open-ended meaning, but also as encompassing "consisting" as well. For example, a device that comprises Part A and Part B may include parts in addition to Part A and Part B, but may also be formed only from Part A and Part B.

Terms

A MXene composition is, generally, any of the compositions described in at least one of U.S. patent application Ser. No. 14/094,966 (filed Dec. 3, 2013), 62/055,155 (filed Sep. 25, 2014), 62/214,380 (filed Sep. 4, 2015), 62/149,890 (filed Apr. 20, 2015), 62/127,907 (filed Mar. 4, 2015) or International Applications PCT/US2012/043273 (filed Jun. 20, 2012), PCT/US2013/072733 (filed Dec. 3, 2013), PCT/US2015/051588 (filed Sep. 23, 2015), PCT/US2016/020216 (filed Mar. 1, 2016), or PCT/US2016/028,354 (filed Apr. 20, 2016), preferably where the MXene composition comprises titanium and carbon (e.g., $Ti_3C_2$, $Ti_2C$, $Mo_2TiC_2$, etc.).

While MXene compositions include any and all of the compositions described in the patent applications and issued patents mentioned elsewhere herein, in some embodiments, MXenes are materials comprising or consisting essentially of a $M_{n+1}X_n(T_s)$ composition having at least one layer, each layer having a first and second surface, each layer comprising a substantially two-dimensional array of crystal cells.

each crystal cell having an empirical formula of $M_{n+1}X_n$, such that each X is positioned within an octahedral array of M, wherein M is at least one Group 3, 4, 5, 6, or 7, wherein each X is C and/or N, and n=4;

wherein at least one of said surfaces of the layers has surface terminations, $T_s$, independently comprising alkoxide, alkyl, carboxylate, halide, hydroxide, hydride, oxide, sub-oxide, nitride, sub-nitride, sulfide, sulfonate, thiol, or a combination thereof:

As described elsewhere within this disclosure, the $M_{n+1}X_n(T_s)$ materials produced in these methods and compositions have at least one layer, and sometimes a plurality of layers, each layer having a first and second surface, each layer comprising a substantially two-dimensional array of crystal cells; each crystal cell having an empirical formula of $M_{n+1}X_n$, such that each X is positioned within an array of M, wherein M is at least one Group 3, 4, 5, 6, or 7 metal (corresponding to Group (IIIB, IVB, VB, VIB or VIIB metal), wherein X is C and/or N and n=4; wherein at least one of said surfaces of the layers has surface terminations, $T_s$, comprising alkoxide, alkyl, carboxylate, halide, hydroxide, hydride, oxide, sub-oxide, nitride, sub-nitride, sulfide, sulfonate, thiol, or a combination thereof.

Supplementing the descriptions above, $M_{n+1}X_n(T_s)$, compositions may be viewed as comprising free standing and stacked assemblies of two dimensional crystalline solids. Collectively, such compositions are referred to herein as "$M_{n-1}X_n(T_s)$," "MXene," "MXene compositions," or "MXene materials." Additionally, these terms "$M_{n+1}X_n$ $(T_s)$," "MXene." "MXene compositions," or "MXene materials" also refer to those compositions derived by the chemical exfoliation of MAX phase materials, whether these compositions are present as free-standing 2-dimensional or stacked assemblies (as described further below). Reference to the carbide equivalent to these terms reflects the fact that X is carbon, C, in the lattice. Such compositions comprise at least one layer having first and second surfaces, each layer comprising: a substantially two-dimensional array of crystal cells; each crystal cell having an empirical formula of $M_{n+1}X_n$, where M, X, and n are defined above. These compositions may be comprised of individual or a plurality of such layers. In some embodiments, the $M_{n+1}X_n(T_s)$ MXenes comprising stacked assemblies may be capable of, or have atoms, ions, or molecules, that are intercalated between at least some of the layers. In other embodiments, these atoms or ions are lithium. In still other embodiments, these structures are part of an energy-storing device, such as a battery or supercapacitor. In still other embodiments these structures are added to polymers to make polymer composites.

The term "crystalline compositions comprising at least one layer having first and second surfaces, each layer comprising a substantially two-dimensional array of crystal cells" refers to the unique character of these materials. For purposes of visualization, the two-dimensional array of crystal cells may be viewed as an array of cells extending in an x-y plane, with the z-axis defining the thickness of the composition, without any restrictions as to the absolute orientation of that plane or axes. It is preferred that the at least one layer having first and second surfaces contain but a single two-dimensional array of crystal cells (that is, the z-dimension is defined by the dimension of approximately one crystal cell), such that the planar surfaces of said cell array defines the surface of the layer; it should be appreciated that real compositions may contain portions having more than single crystal cell thicknesses.

That is, as used herein, "a substantially two-dimensional array of crystal cells" refers to an array which preferably includes a lateral (in x-y dimension) array of crystals having a thickness of a single cell, such that the top and bottom surfaces of the array are available for chemical modification.

Metals of Group 3, 4, 5, 6, or 7 (corresponding to Group IIIB, IVB, VB, VIB, or VIIB), either alone or in combination, said members including, e.g., Ti, Zr, Hf, V, Nb, Ta, Cr, Mo, and W. For the purposes of this disclosure, the terms "M", or "M'", or "M''", or "M atoms," "M elements," or "M metals" may also include Mn. Also, for purposes of this disclosure, compositions where M comprises Ti, Zr, Hf, V, Nb, Ta, Cr, Mo, W, or mixtures thereof constitute independent embodiments. Similarly, the oxides of M may comprise any one or more of these materials as separate embodiments. For example, M may comprise any one or combination of Hf, Cr, Mn, Mo, Nb, Sc, Ta, Ti, V, W, or Zr. In other preferred embodiments, the transition metal is one or more of Ti, Zr, V, Cr, Mo, Nb, Ta, or a combination thereof. In even more preferred embodiments, the transition metal is Ti, Ta, Mo, Nb, V, Cr, or a combination thereof.

The range of compositions available can be seen as extending even further when one considers that each M-atom position within the overall $M_{n+1}X_n$ matrix can be represented by more than one element. That is, one or more type of M-atom can occupy each M-position within the respective matrices. In certain exemplary non-limiting examples, these can be $(M'_aM''_b)X_4$, where M' and M'' are different metals (e.g., members of the same group), and a+b=5; or $(M'_aM''_b)_5X_4T_x$, where M' and M'' are different metals (e.g., members of the same group), and a+b=1. As some non-limiting examples, such a composition can be $(V_{1/2}Nb_{1/2})_5C_4$ or $(V_{1/3}Nb_{2/3})_5N_4$.

In the same way, one or more type of X-atom can occupy each X-position within the matrices, for example solid solutions of the formulae $M_5(C_jN_k)_4$ (where j+k=1); $(M'_aM''_b)(C_jN_k)_4$ (where a+b=5 and j+k=1); and $(M'_aM''_b)_5$ $(C_jN_k)_4$ (where a+b=1 and j+k=1).

MXene materials can be prepared by selectively removing an A group element from a precursor MAX-phase material. Depending on the specific MAX being considered, these A group elements may be independently defined as including Al, As, Cd, Ga, Ge, P, Pb, In, S, Sn, or Tl. These same materials are contemplated as independent embodiments for the A element used in the present invention. Some of these A-group elements may be removed in aqueous media, for example, by a process comprising a treatment with a fluorine-containing acid. For example, Al, As, Ga, Ge, In, P, Pb, S, or Sn may be removed in this way, although Al is especially amenable to such extractions. Aqueous hydrofluoric acid is particularly suitable for this purpose, whether used as provided, or generated in situ by other conventional methods. Such methods include the use of any one or more of the following:

(a) aqueous ammonium hydrogen fluoride ($NH_4F \cdot HF$);

(b) an alkali metal bifluoride salt (i.e., $QHF_2$, where Q is Li, Na, or K), or a combination thereof; or (c) at least one fluoride salt, such as an alkali metal, alkaline earth metal, or ammonium fluoride salt (e.g., LiF, NaF, KF, CsF, $CaF_2$, tetraalkyl ammonium fluoride (e.g., tetrabutyl ammonium fluoride)) in the presence of at least one mineral acid that is stronger than HF (i.e., has a higher Ka value) and can react with fluorides to form HF in situ (such as HCl, HBr, HI, $H_3PO_4$, $HNO_3$, oxalic acid, or $H_2SO_4$); or (d) a combination of two or more of (a)-(c). in some cases, the use of molten fluoride salts in inert atmosphere (Ar, $N_2$) may be used to remove the group 13 or 14 element (e.g., at 500-600° C., e.g., above the melting temperature of LiF, NaF, KFCsF, $CaF_2$ salts).

In specific embodiments, the fluorine-containing acid is derived from lithium fluoride and a strong aqueous mineral acid, such as HCl, $HNO_3$, or $H_2SO_4$, preferably HCl.

It also appears that the use of aqueous HF in the presence of one or more alkali halides, such as LiCl, provides advantages over using HF alone, or by reacting LiF with aqueous HCl. The use of LiF with aqueous HCl avoids the handling issues associated with the use of aqueous HF and provides higher yields of single-layer flakes, in some cases it may be difficult to remove LiF impurities and the removal of the A-element (e.g., Al) is slower. The use of LiCl with aqueous HF provides more crystalline MXene phases, with better control of the basal spacing (c parameter) and it is easier to vary the procedures especially for those involving ion intercalation. The foregoing is exemplary only, however, and does not limit the scope of the present disclosure or the appended claims.

Two-dimensional (2D) materials such as graphene, hexagonal boron nitride, and transition metal dichalcogenides have gained significant attention due to their unique electronic, photonic, electrochemical, and optical properties. The 2D nature of these materials allows for novel applications compared to their bulk counterparts such as transitors[1], solar cells, touch screens, biosensors, and lasers. In 2011, MXenes were introduced as a new family of 2D materials.

MXenes are 2D transition metal carbides and nitrides that have the formula unit $M_{n+1}X_nT_x$ where M stands for an early transition metal (Ti, Nb, V, Cr, Mo, Ta, etc.), X stands for carbon and/or nitrogen, $T_x$ represents surface termination groups such as —OH, =O and —F, and n is an integer from 1 to 3. Here, the common notation $M_{n+1}X_n$ will be used and we do not show the $T_x$ for brevity. Within the three types of $M_2X$, $M_3X_2$, and $M_4X_3$ MXene structures, there are several available compositional possibilities including the mono-metal MXenes, ordered double metal MXenes with in-plane and out-of-plane ordering $((M'M'')_{n+1}X_n)$, divacancy MXenes with the formula unit $M_{1.33}X_n$, and solid solution MXenes containing a mixture of multiple metals in the M sites.

MXenes have become increasingly researched due to exceptional properties such as high volumetric capacitance, antibacterial properties, electrochromic behavior, high electronic conductivity, and optical transparency. These properties have demonstrated to be beneficial for numerous applications including energy storage, catalysis, antennas and RFID tags, electromagnetic interference (EMI) shielding, sensors, and as plasmonic metamaterials. Furthermore, it has been shown that the MXene composition and structure play a vital role in the observed properties. A list of experimentally synthesized MXenes reported to date, including the one reported here, is shown in FIG. 1.

MXenes can be produced by the selective chemical etching of specific atomic planes from layered carbide/nitride precursors. Most commonly, $M_{n+1}AX_n$ (MAX) phases are the precursor materials and MXenes are produced by selectively etching the A layers, where A represents Al or Si. The resulting MXene structure is dependent on that of its MAX phase precursor, which has limited the MXene family to materials with 2, 3, or 4 atomic layers of transition metal. Provided here is a new, unexpected MXene with 5 atomic layers of transition metal (e.g., $M_5X_4$). The new MXene can be made from by synthesizing its precursor MAX phase with 5 atomic layers of transition metal.

In some instances, the presence of different MAX phases ($M_2AC$, and $M_4AC_3$) as impurities can result in a MXene that contains other MXenes (for example, $M_2C$. and $M_4C_3$ in a $M_5C_4$ MXene). A $M_5AX_4$ MAX phase with no other MAX phase impurities can be used to synthesize the first phase pure $M_5X_4$ MXene, though this is not at all times a requirement.

Here we present an example $Mo_4VAlC_4$ MAX phase with no other MAX phase impurities, allowing for the synthesis of $Mo_4VC_4$ MXene. We provide structural characterization via high-resolution transmission electron microscopy, X-ray diffraction, scanning electron microscopy, and atomic force microscopy. In addition, chemical characterization via energy dispersive X-ray spectroscopy and X-ray photoelectron spectroscopy is presented with the optical, electrical, and thermal properties of $Mo_4VC_4$ determined via UV-vis-NIR spectrophotometry, temperature-dependent resistivity, and thermogravimetric analysis. Density functional theory calculations were used to show the theoretical stabilities of other $M_5AX4$ phases. Due to the increased number of atomic layers in their structure, MXenes with 5 atomic transition metal layers have attractive mechanical properties allowing for stronger metal matrix composites, better EMI shielding capabilities, and higher electrical conductivity for electronic applications.

It should be understood that although $Mo_4VAlC_4$ is used herein as an example MAX-phase material for the further formation of a 5-layer MXene ($Mo_4VC_4$), it should be understood that both $Mo_4VAlC_4$ MAX-phase material and $Mo_4VC_4$ MXene are illustrative only and do not limit the scope of the present disclosure or the appended claims.

Experimental Procedure

Synthesis of $Mo_4VAlC_4$ MAX

Figure 10:
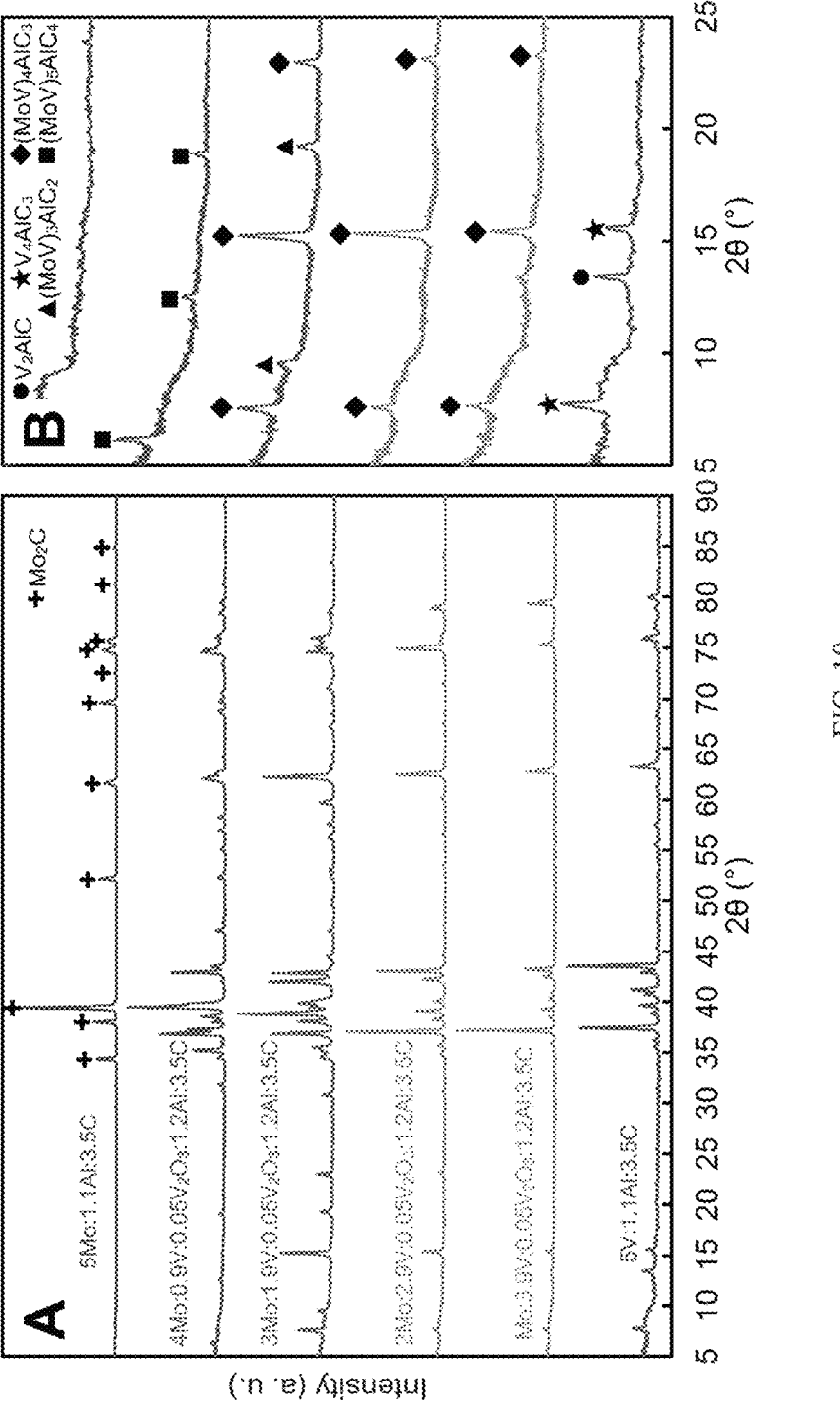
FIG. 10. XRD patterns of MAX phase samples. A) Full XRD patterns for the materials resulting from mixing various compositions of the $Mo_xV_{5-x}AlC_4$ system where x ranges from 0-5 (0-100% Mo). Only $Mo_4VAlC_4$ produces an $M_5AX_4$ phase. B) Zoom-in view of the same XRD patterns showing the non-$M_5AX_4$ MAX phases that resulted from the various ratios of Mo:V.

Molybdenum (99.9% Alfa Aesar, −250 mesh), vanadium (99.5% Alfa Aesar, −325 mesh), vanadium (III) oxide (98% Sigma Aldrich), aluminum (99.5% Alfa Aesar, −325 mesh), and graphite (99% Alfa Acsar, −325 mesh) powders were hand-mixed with a mortar and pestle for 5 min in a molar ratio of 4:0.9:0.05:1.2:3.5 (Mo:V:$V_2O_3$:Al:C). To determine the proper Mo:V mixing ratio, we mixed a series different ratios from 0-100% Mo (FIG. 10). The mixtures were heated in alumina crucibles at a rate of 3° C./min to 1650° C. under 350 $cm^3$/min flowing argon in a tube furnace (Carbolite Gero) and held for 4 h before passive cooling to room temperature. After removal from the furnace, the blocks of $Mo_4$ V $AlC_4$ MAX phase were drilled into powder. 15 g of this powder was then stirred in 50 mL of HCl (36.5-38% Fisher Chemical) for 18 h to dissolve impurities. The HCl was washed out through a series of centrifugations at 3500 rpm (2550 rcf) for 3 min, decanting the acidic supernatant, and re-dispersing the sediment in deionized (DI) water. After washing, the MAX powder was dried in a vacuum desiccator for 18 h at 25° C. Then the powder was sieved to a particle size <75 μm.

Synthesis of $Mo_4VC_4$ MXene

Figure 2:
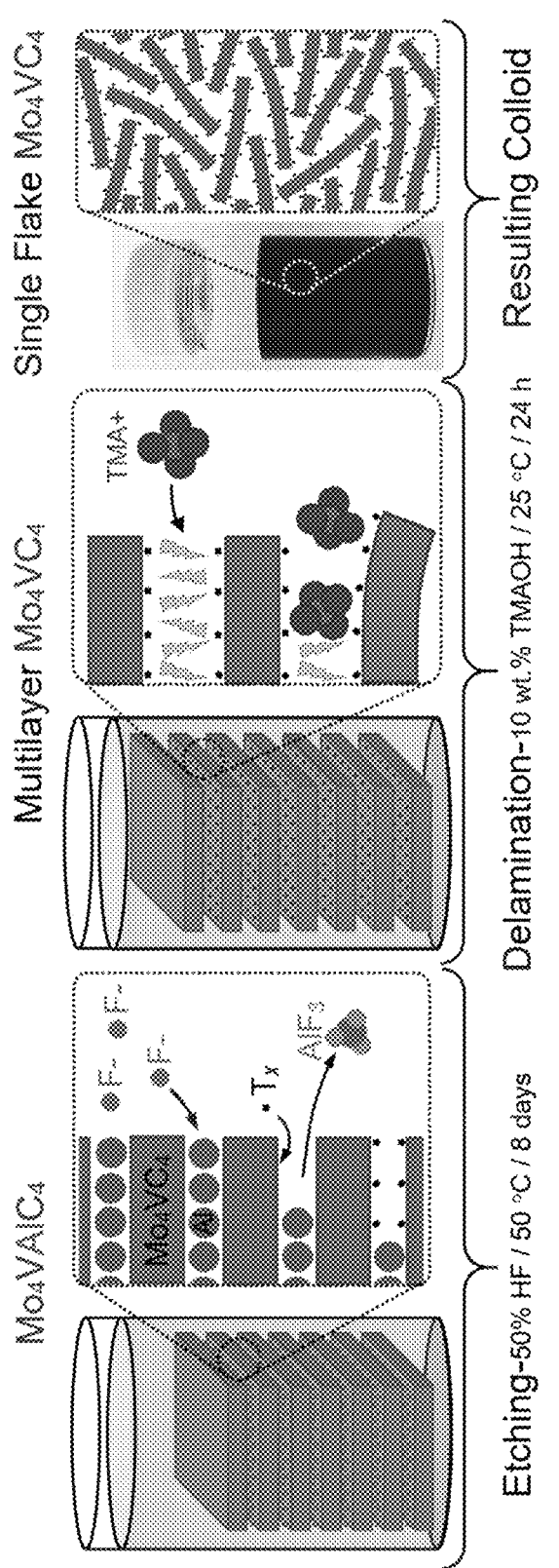
FIG. 2. $Mo_4VAlC_4$ MAX phase is etched with HF solution to produce $Mo_4VC_4$ MXene. The fluorine ions selectively remove the Al layers of the MAX structure to form $AlF_3$ and surface terminations bond to the basal planes of the resulting MXene. Afterwards, the MXene flakes are held together by weak van der Waals forces and can be delaminated by introducing tetramethylammonium (TMA*) ions that intercalate between the layers, forcing them apart. This results in a colloidal suspension of 2D MXene flakes.

A schematic for the synthesis of $Mo_4VC_4$ MXene is shown in FIG. 2. To synthesize multilayered (ML) MXene, 4 g of the MAX powder was slowly added to 40 ml of hydrofluoric acid (HF) (48-51% Arcos Organics). The sample was stirred with a polytetrafluoroethylene (PTFE) stir bar at 400 rpm and heated in an oil bath at 50° C. for 8 days. After that, the mixture was washed with the same washing procedure previously described in the MAX synthesis section. After the pH of the mixture was more than 6, the ML MXene was collected on a MF-Millipore 0.45 μm mixed cellulose esters (MCE) membrane via vacuum-assisted filtration. The wet ML MXene powder was then dried in a vacuum desiccator for 18 h at 25° C.

Exfoliation of the ML MXene was achieved by dispersing 0.25 g of ML $Mo_4VC_4$ powder in a 10 mL solution of 10 wt. % tetramethylammonium hydroxide (TMAOH, 25 wt. %-diluted to 10 wt. %, Sigma Aldrich) and stirred at 400 rpm at 25° C. for 24 h. Another series of washing cycles was used to remove the TMAOH. In brief, the mixture was centrifuged at 8,000 rpm (8230 rcf) for 30 min to settle the material and, after decanting the alkaline supernatant, the sediment was re-dispersed with DI water and this was repeated 5 times. High-speed centrifugation was needed due to the stability of the $Mo_4VC_4$ flakes in the alkaline solution. Once the decanted supernatant had a pH<8, the remaining sediment was re-dispersed in 30 mL of DI water and bath sonicated (100 W, 40 kHz) for 1 h with argon bubbling through it. After sonication, the solution was centrifuged at 3500 rpm (2550 ref) for 1 h. The resulting supernatant was carefully removed with a pipette to avoid re-dispersal of, and contamination with, the ML MXene/MAX phase sediment and transferred into a separate bottle.

$Mo_4VC_4$ Film Preparation

To obtain a free-standing film of $Mo_4VC_4$, the colloid containing delaminated MXene flakes was filtered via vacuum-assisted filtration through a Celgard membrane (Celgard 3501-64 nm porous polypropylene). The resulting MXene films were dried in a vacuum desiccator for 18 h at 25° C.

Structural Characterization

Crystal structures were characterized with X-ray diffraction (XRD). Rigaku SmartLab and MiniFlex X-ray diffractometers were used and Ni-filtered Cu-Kα radiation was used at 40 kV/30 mA and 40 kV/15 mA respectively. The step size of the scan was 0.01° with a step duration of 4 s for the as-produced $Mo_4VAlC_4$ and 2 s and ML $Mo_4VC_4$ and $Mo_4VC_4$ films. The appended table provides the position of XRD peaks, d spacings, and corresponding intensities for the as-prepared $Mo_4VAlC_4$ sample powder from 3-120°.

Microscopy

Scanning electron microscopy (SEM) micrographs were obtained with a Zeiss Supra 50VP scanning electron microscope and an FEI Strata DB235 Dual Beam Focused Ion Beam SEM. Transmission electron microscopy (TEM), scanning transmission electron microscopy (STEM), and selected area electron diffraction (SAED) were performed on a JEOL JEM F200 and JEOL NEOARM at an operating voltage of 200 kV. The colloids containing delaminated $Mo_4VC_4$ flakes and particles of $Mo_4VAlC_4$ and ML $Mo_4VC_4$ were drop-cast onto TEM grids. Atomic force microscopy (AFM) was performed with a Bruker Multimode 8 with a Si tip (Budget Sensors Tap300Al-G; $f_0$=300 kHz, k=40 N/m) via a standard tapping mode in air. The colloid containing delaminated $Mo_4VC_4$ flakes was drop-cast onto oxygen plasma-cleaned $SiO_2$/Si wafers.

Compositional Characterization

Chemical compositions were determined by energy dispersive X-ray spectroscopy (EDS) measurements. EDS spectra of the MAX phase and ML MXene particles were recorded by a FEI Strata DB235 Dual Beam Focused Ion Beam SEM with EDS with a 25 kV beam and an average of 360,000 counts per spectrum. Atomic-resolution EDS spectra of the MAX and MXene atomic layers were recorded.

Chemical compositions were also determined via X-ray photoelectron spectroscopy (XPS). XPS spectra were collected by a spectrometer (Physical Electronics, Versa Probe 5000, MN) using a monochromatic Al Kα X-ray source with 200 μm spot size. Charge neutralization was performed using a dual-beam charge neutralizer. The sample was sputtered with high energy Ar (2 kV, 2 μA) for 2 min inside the analysis chamber. High-resolution spectra were collected at a pass energy of 23.5 eV with a step size of 0.05 eV, whereas the survey spectra were collected at a pass energy of 117 eV with a step size of 0.5 eV. The quantification and peak fitting of the core-level spectra was performed using Casa XPS software package with Shirley-type background.

Raman spectra were obtained with an inverted reflection mode Renishaw (2008, Gloucheshire, UK) instrument, equipped with 63× (NA=0.7) objectives and a diffraction-based room-temperature spectrometer. The laser line used was 514 nm (Ar laser with 488 and 514 nm emissions) with an 1800 line/mm grating. The power of the laser was kept in the ~0.5-1 mW range. Mapping was performed by raster scanning in the streamline mode at a $0.5\mu$ x-axis step, the final spectra were an average of all collected data. Fitting was performed in Renishaw WIRE 3.4 software. The $Mo_4VAlC_4$ MAX phase and $Mo_4VC_4$ ML MXene powder were pressed in a 13 mm diameter die to form pellets that were analyzed with the spectrometer.

Optical Properties

UV-visible spectrophotometry spectra were obtained by spray coating thin films of $Mo_4VC_4$ onto oxygen plasma-cleaned glass slides. Films of various thickness were measured via UV-vis spectrophotometry from 300-1000 nm (Thermo Scientific Evolution 201) and from 1100 to 2500 nm (Nicolet iS50R FT-IR) operating in transmission mode. Glass slides were used as a blank. Transmission was measured on three locations on each film and the average spectra are reported.

Electrical Properties

Electrical resistivity was measured using a Jandel cylindrical four-point probe with a ResTest Test Unit. The thickness of $Mo_4VC_4$ MXene films was measured with a micrometer. The thickness of each film and the resistivity was measured on 10 places on each film and the average values are reported.

Temperature-dependence of resistivity and Hall measurements were performed in physical property measurement system (PPMS, Evercool II, Quantum Design). Free-standing MXene films were wired to the PPMS sample holder using silver wire and silver paint in 4-point and van de Pauw configurations. The resistance of the film was recorded from 10 to 300 K with a heating/cooling rate of 4 K/min. Magnetoresistance (MR) and Hall resistance were measured at 10 K with a magnetic field up to 5 Tesla applied perpendicular to the sample surface.

Thermal Analysis

The thermal stability of a $Mo_4VC_4$ film was studied by thermogravimetric analysis (SDT 650, TA Instruments) connected to a mass spectrometer (Discovery, TA Instruments). Free-standing MXene films with masses around 5 mg were packed in a 90 $\mu$L alumina pan and heated to 1500° C. at a constant heating rate of 10° C./min under Ar atmosphere (100 mL/min). The furnace was purged with Ar gas (100 mL/min) for 1 h before the analysis to remove air residue.

Density Functional Theory Calculations

The Vienna Ab-Initio Simulation Package (VASP) was used for all DFT calculations. Structural relaxations were performed with the Perdew Burke Ernzerhof (PBE) exchange-correlation functional and projector augmented wave (PAW) pseudopotentials, with a 520 eV plane-wave basis cutoff, a 8×8×1 $\Gamma$ centered k-point mesh for structural relaxations, and forces on each atom converged to below $10^{-2}$ eV/Å. Electronic property calculations and total energies were converged to $10^{-8}$ eV and a dense 18×18×1 $\Gamma$ centered k-point mesh was used. 2×2×1 supercells (with 32 Mo atoms and 8 V atoms) were constructed to approximate disordered $Mo_4VC_4$ solid solutions. The Mo:V composition of 4:1 was kept fixed in all solid solution calculations and 18 configurations were generated by randomly positioning the Mo and V atoms in the structure. Meshes were adjusted appropriately for 2×2×1 supercell solid solution calculations. The calculations for the stabilities of other $M'_4M''AlC_4$ MAX phases were limited to ordered phases where M'' was sandwiched between two atomic layers of M' on both sides. Calculations of formation energies relative to the most stable unary phases provide trends in stability. However, the materials with negative formation energies could decompose into competing binary carbide, intermetallic, or other MAX phases that are more stable. Likewise, there may be materials with more stable solid solution phases that have not been considered here. The work presented here is meant to serve as a benchmark and to provide trends in stability as a function of M element composition.

Results and Discussion

Synthesis and Structural Characterization

Figure 11:
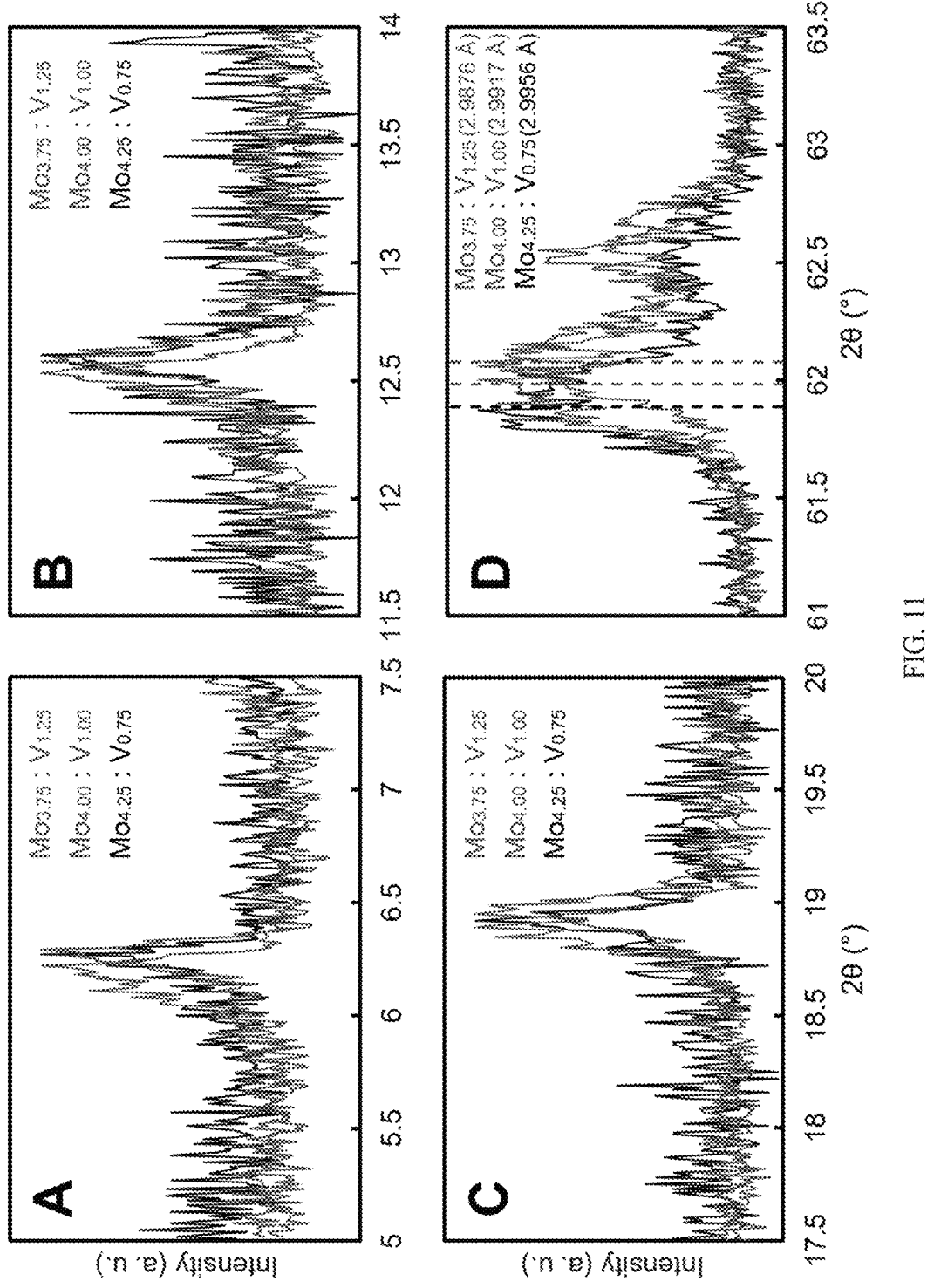
FIG. 11. XRD patterns of three samples made with Mo:V ratios of 3.75:1.25, 4.00:1.00, and 4.25:0.75. Zoom-in views are provided for the A) (002) peak, B) (004) peak, C) (006) peak, and D) (110) peak also showing the a-LP for each sample.

To identify the proper chemistry for $M_5AlC_4$ synthesis, we mixed six sets of starting powder mixtures with $Mo_x:V_{5-x}$ ratios where x=5, 4, 3, 2, 1, and 0. We used XRD after the MAX synthesis process at 1650° C. and determined that only the sample with a Mo:V ratio of 4:1 produced a $M_5AlC_4$ phase, as shown in FIG. 10. Then a smaller interval was selected, where x=3.50, 3.75, 4.00, 4.25, and 4.50, which shows the Mo:V ratio range for which a $M_5AX_4$ phase is stable is very narrow. These results are further discussed herein (FIG. 11). In brief, the $Mo_xV_{5-x}AlC_4$ phase can be synthesized when the Mo:V ratio in the initial mixed powders are 3.75:1.25 to 4.25:0.75. FIG. 11 also shows an expansion in the a lattice parameter (a-LP) by increasing the Mo content, which indicates that different Mo:V ratios are possible in the $(MoV)_5AlC_4$ structure, most likely as a solid solution of Mo and V on the M sites. For the remainder of our characterization and for the synthesis of MXene, we use $(MoV)_5AlC_4$ synthesized by mixing precursor powders using a Mo:V ratio of 4:1.

Figure 3:
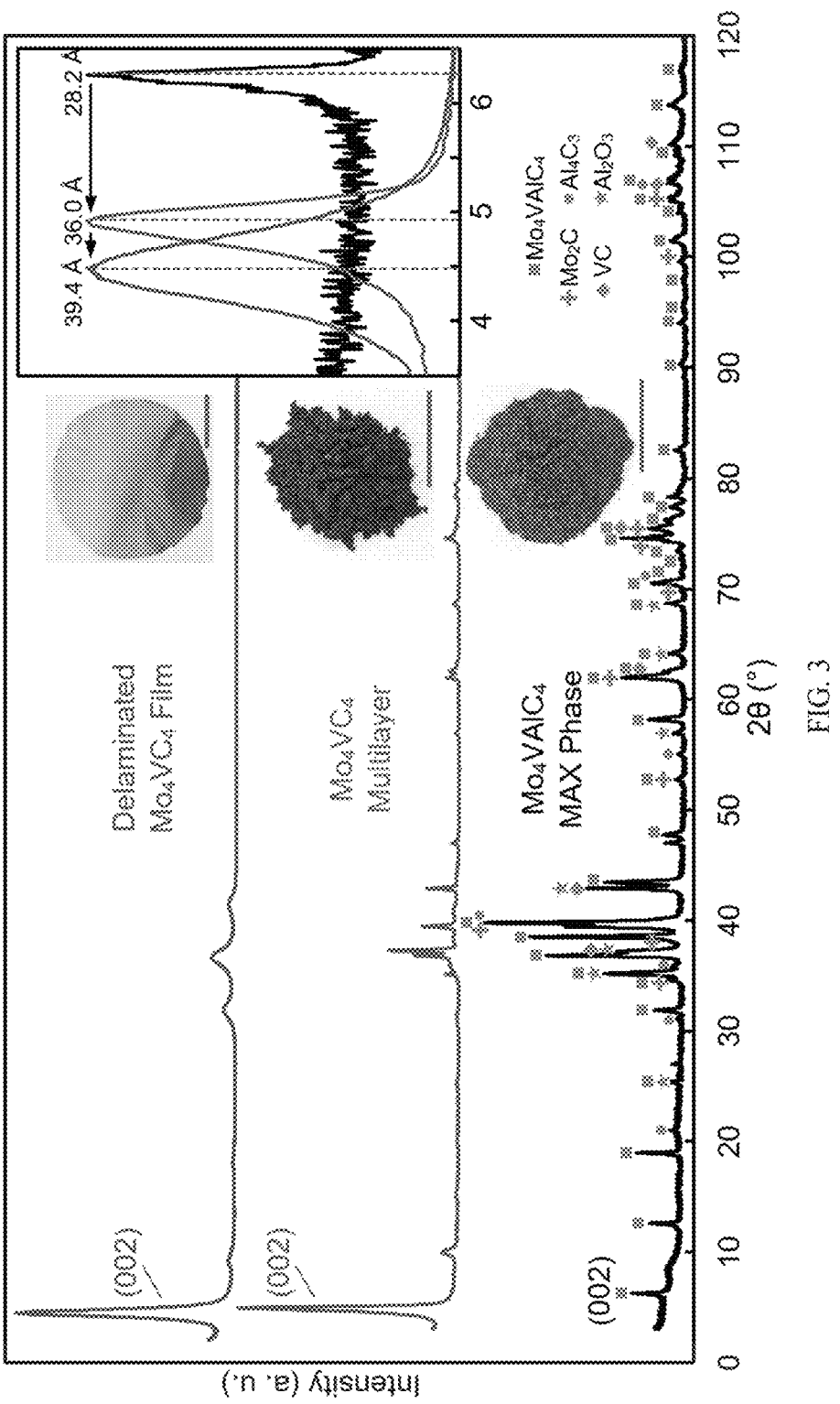
FIG. 3. XRD patterns of $Mo_4VAlC_4$ MAX phase powder, $Mo_4VC_4$ ML MXene powder, and free-standing film of delaminated $Mo_4VC_4$ MXene. Insets on the top of each XRD pattern show optical images of the corresponding powders/film. The scale bars on the optical images are 1 cm. Top right inset shows a close view of the peak shift indicating exfoliation and delamination. The c-LP values are provided for all three XRD patterns.
Figure 12:
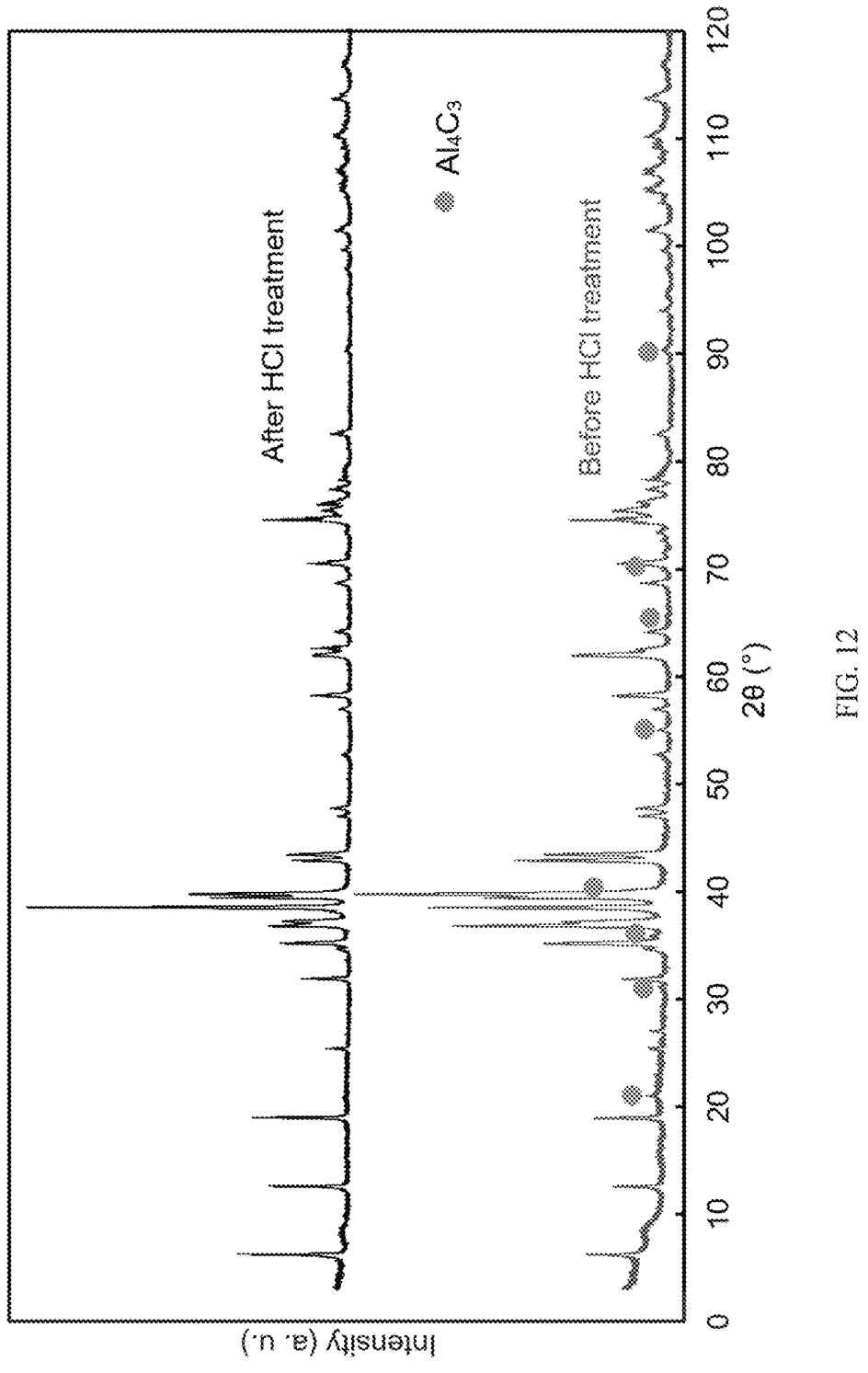
FIG. 12. XRD) patterns of the $Mo_4VAlC_4$ powder as produced and after HCl treatment. The $Al_4C_3$ peaks are no longer present after washing indicating that this carbide was successfully removed.
Figure 13:
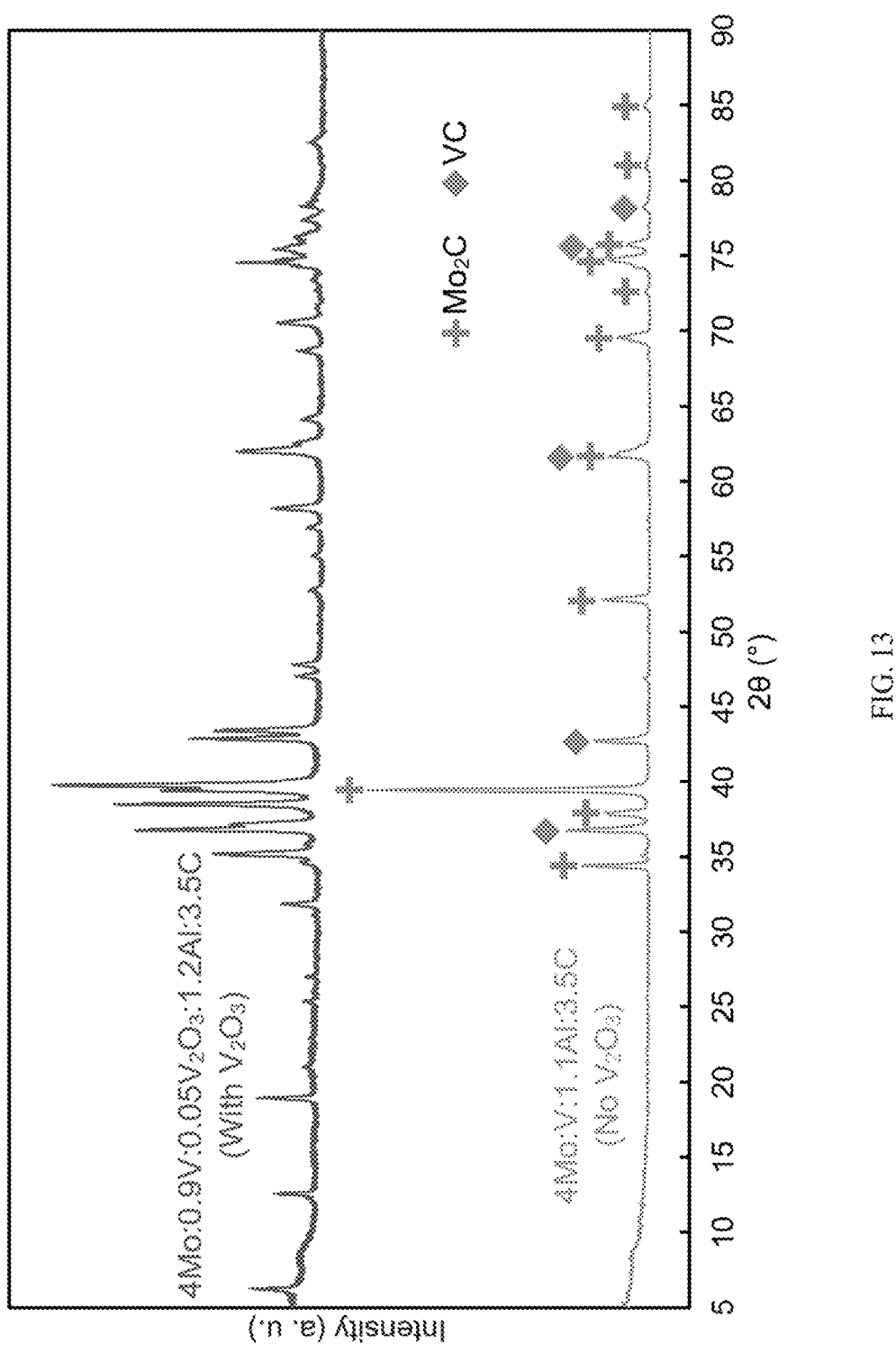
FIG. 13. XRD patterns of the $Mo_4VAlC_4$ powder as produced as produced without (orange) and with (blue) $V_2O_3$.

We also used XRD to examine the crystal structure of both the $Mo_4VAlC_4$ MAX phase and $Mo_4VC_4$ MXene (FIG. 3). $Mo_4VAlC_4$ has a structure similar to other MAX phases, although several of the peaks in the XRD spectrum do not exactly match with the characteristic peaks of a typical $P6_3/mmc$ MAX structure. The (002) peak occurs at 6.26° indicating a c lattice parameter (c-LP) of 28.216 Å, which is similar to $(TiNb)_5AlC_4$ reported previously 50, and among the largest c-LP among all the known MAX phases. For comparison, $Ti_2AlC$, $Ti_3AlC_2$, and $Ta_4AC_3$ have c-LPs of 13.610 Å[55], 18.578 Å[56], and 23.708 Å[57], respectively. $Mo_4VAlC_4$ powder contains impurity phases of $Mo_2C$, VC, $Al_4C_3$, and $Al_2O_3$. The $Al_4C_3$ is dissolved during the HCl-cleaning step (FIG. 12). Without being bound to any particular theory, the presence of $Al_2O_3$ may be due to the addition of $V_2O_3$ in the starting powder. As we describe herein, although we do not fully understand the role of 0.05 mol of vanadium oxide in this MAX formation, its presence is required to form a phase pure $M_5AC_4$ phase with the conditions we report here. Without being bound to any particular theory, oxygen may act as a catalyst for this reaction by partially substituting for carbon on the lattice forming oxicarbide, which might stabilize the structure. Additionally, the extra heat produced during the thermal reduction of $V_2O_3$ by Al might push the sample into the $(MoV)_5AlC_4$ region of this quaternary phase diagram. Without the addition of $V_2O_3$, the resulting powder was $Mo_2C$ and VC (FIG. 13).

Figure 14:
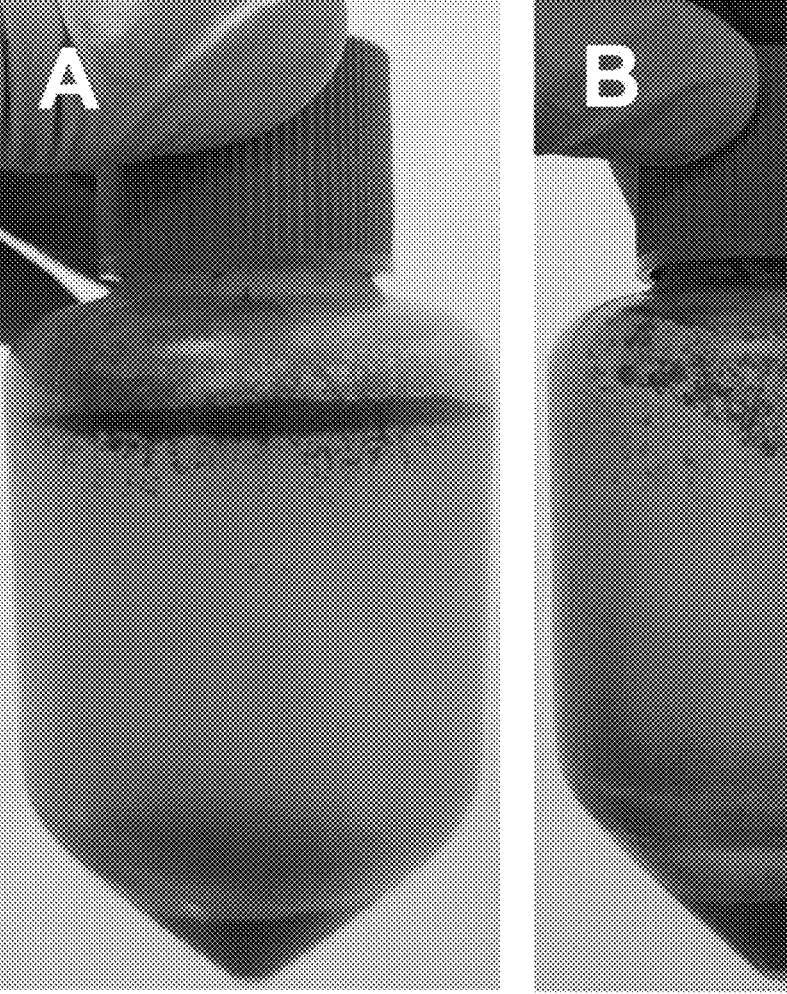
FIG. 14. Analysis of supernatant. A) Green-tinted supernatant after the first wash cycle. B) Colorless supernatant after each subsequent cycle. The particles at the top are PTFE from the stir bar and are removed during washing steps.
Figure 15:
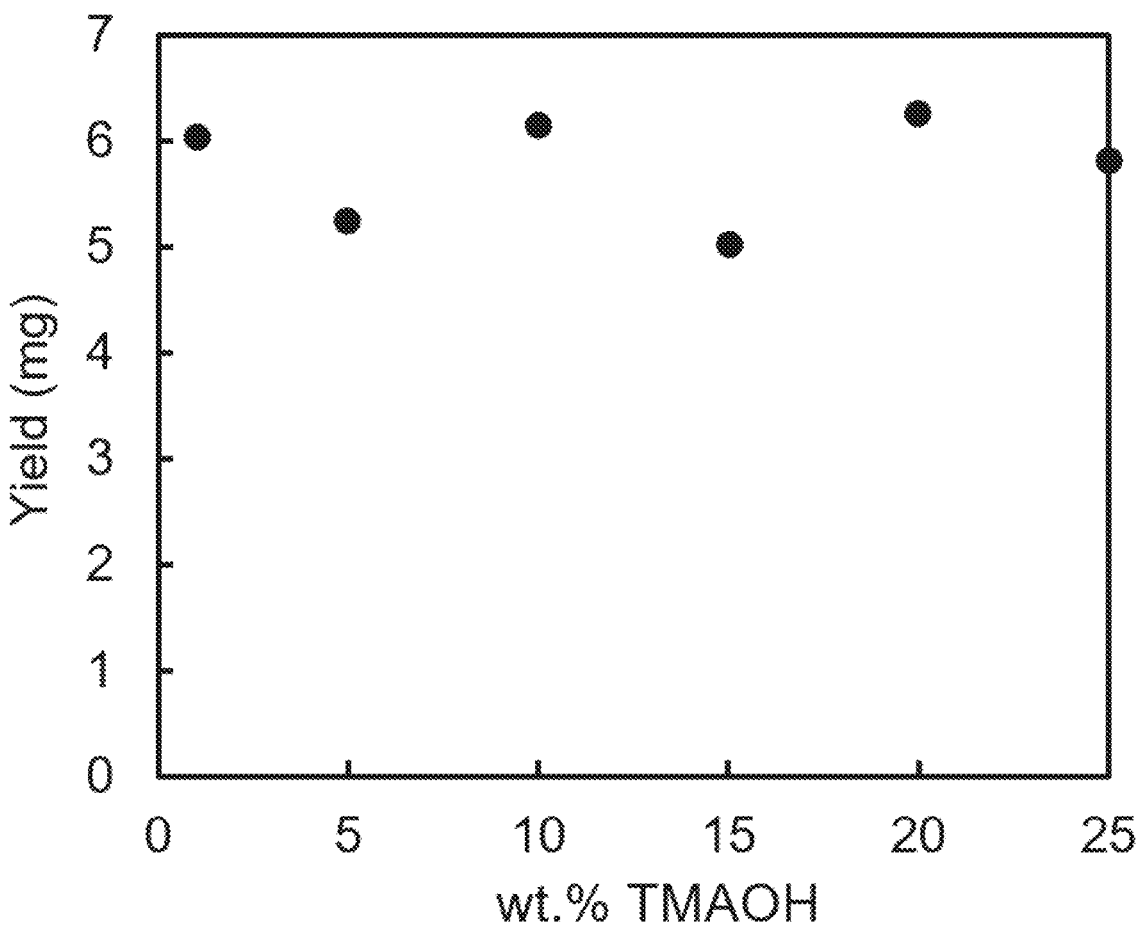
FIG. 15. Mass yield of the delamination procedure as a function of TMAOH concentration. For the concentrations tested, there is minimal variation in weight of the resulting MXene film.
Figure 16:
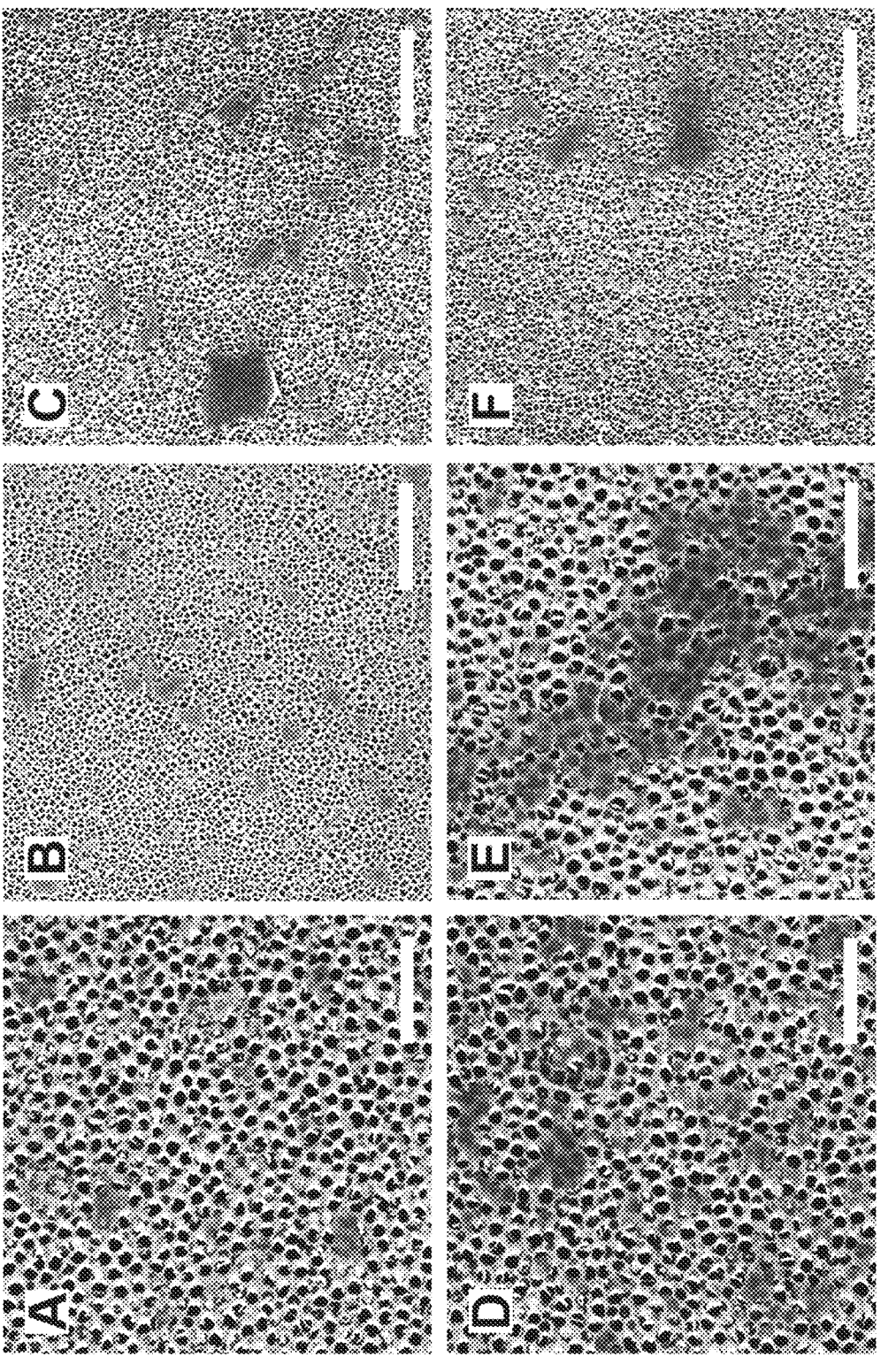
FIG. 16. SEM micrographs of the drop-cast $Mo_4VC_4$ single flakes produced with various concentrations of TMAOH. A) 1 wt. %. B) 5 wt. %. C) 10 wt. %. D) 15 wt. %. E) 20 wt. %. F) 25 wt. %. Holes are visible in the flakes produced with 15, 20, and 25 wt. % TMAOH. Each scale bar is 2 μm.

Similar to other Al-containing MAX phases, we attempted to etch the Al layers with HF. During the first centrifugation wash cycle after the HF selective etching, the supernatant had a slight green tint (FIG. 14). This is likely due to the dissolution of V from the MAX/MXene since any V-containing impurities remaining after the HCl treatment, such as V-based carbides, would not be dissolved by HF. The process of optimizing the synthesis method is described herein (FIGS. 15-16). After selective etching and the removal of the Al layers from the MAX structure, the resulting MXene (002) peak shifts to a lower 2θ, which is due to the increased c-LP (36.0 Å) compared to that of the MAX precursor (28.2 Å). This is comparable to other reported increases in c-LP after etching. After delamination of the resulting powder with TMAOH, a colloid with a concentration of ~0.25 mg/ml, was obtained. By vacuum filtering the colloid, a film of $Mo_4VC_4$ was made. The (002) peak of the resulting film is shifted to an even lower 2θ after delamination as a result of the further increase in c-LP (39.4 Å) due to the complete exfoliation of the MXene flakes and intercalation of tetramethylammonium cations used in the delamination process. This indicates an increase in c-LP of 3.4 Å. Similar increases in c-LP after complete delamination have also been reported for other MXenes, such as $Ti_3C_2$ (4.48 Å).

Although the foregoing example describes chemical exfoliation, it should be understood that exfoliation can also be accomplished by other approaches, e.g., electrochemically. In various embodiments, MAX phase materials are selectively exfoliated to form the corresponding MXene by the application of potentiostatic or galvanostatic polarization. Still further, in addition to those embodiments described for the compositions provided above, other embodiments provide for compositions provided by the methods of preparation described herein. For example, those composition obtained from subjecting a MAX phase material to a chemical exfoliation process, said exfoliation process comprising treatment with aqueous HF and sonication, wherein a substantial portion of the A atoms are removed should also be considered within the scope of the present invention.

Microscopy

Figure 4:
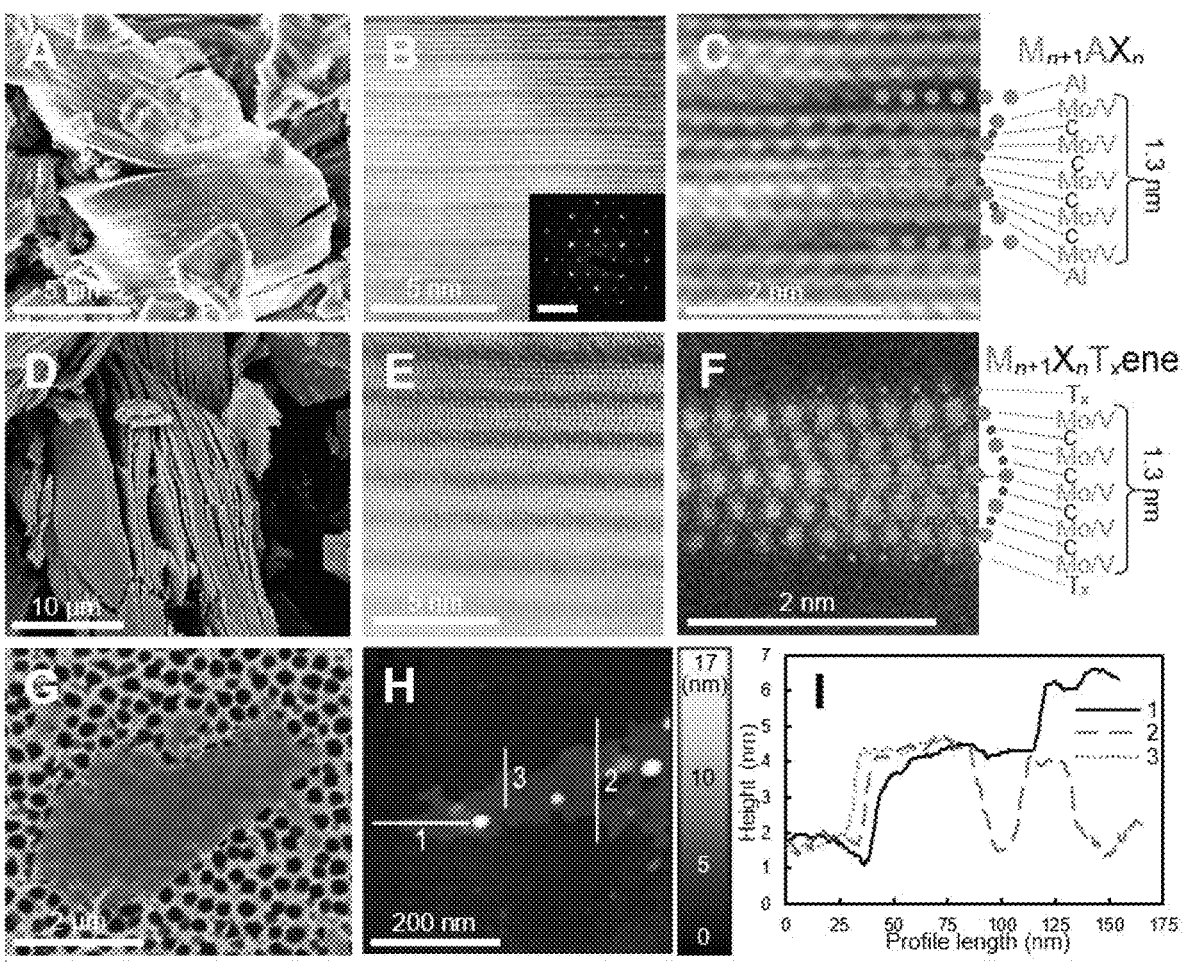
FIG. 4. Microscopic analysis of MAX and MXene. A) SEM micrograph of $Mo_4VAlC_4$ MAX phase powder. B) HRTEM micrograph of $Mo_4VAlC_4$ MAX phase with inset SAED pattern of the (001) zone axis. The scale bar for the SAED pattern is 1 $Å^{-1}$. C) Atomic-resolution HRTEM micrograph of $Mo_4VAlC_4$ MAX phase showing a herring bone-type structure. The solid circles on the right represent the atoms and the dashed line represents the mirror plane. D) SEM micrograph of $Mo_4VC_4$ ML-MXene powder. E) Dark field STEM micrograph of $Mo_4VC_4$ ML MXene powder showing stacked 2D flakes with 5 layers of bright atoms (Mo/V layers). F) Atomic-resolution dark field STEM of $Mo_4VC_4$ MXene also exhibiting a herring bone-type structure. An atomic schematic and mirror plane are shown by solid circles on the right and a dashed line respectively. G) SEM micrograph of a single $Mo_4VC_4$ flake drop-cast onto a porous alumina substrate. H) AFM micrograph of $Mo_4VC_4$ flakes. I) Height profiles of the AFM scans shown in H, showing an average thickness of 2.5 nm.
Figure 17:
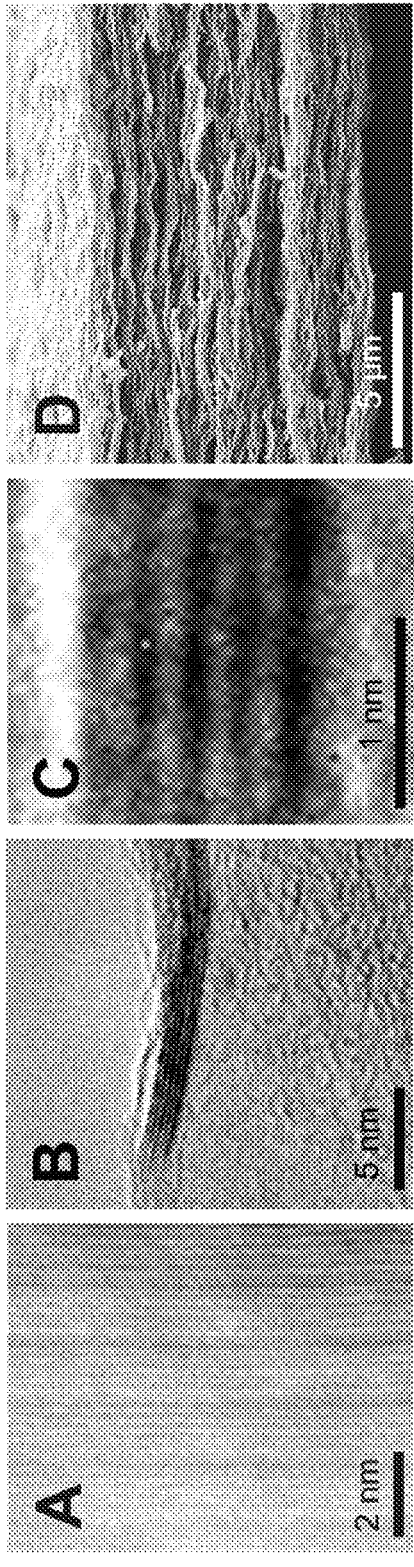
FIG. 17. TEM analysis of MXene. A) STEM dark field micrograph of $Mo_4VAlC_4$ MAX phase. B) TEM micrograph of a $Mo_4VC_4$ single flake drop cast onto a TEM grid. C) Zoom-in view of the micrograph in A. D) SEM micrograph of a cross-section of a film produced be filtering a colloid of these delaminated flakes.

SEM of $Mo_4VAlC_4$ (FIG. 4A) shows the typical layered structure for MAX phase particles. To confirm the 5-transition-metal-layered structure of $Mo_4VAlC_4$, TEM was used (FIG. 4B). The alternating layered structure with brighter layers occurring every 6 layers suggests that slabs of $Mo_4VC_4$ are sandwiched between single Al layers (layers of carbon atoms are not visible). STEM dark field shows brighter atomic layers (lighter weight Al layers) alternating with slabs of darker atoms (heavier Mo/V layers) (FIG. 17A). A SAED pattern of the (001) zone axis confirms a hexagonal crystal structure (FIG. 4B inset).

Upon further examination at higher-resolution it was discovered that the center Mo/V plane of atoms is a twin After delamination, $Mo_4VC_4$ colloid was drop-cast onto porous alumina and SEM shows the individual 2D flakes (FIG. 5G). TEM of a single $Mo_4VC_4$ flake (FIGS. 8B-C) shows a thickness of ~1.3 nm which is similar to the thickness of the $Mo_4VC_4$ slabs in the MAX structure. AFM results (FIGS. 5H-1) show the $Mo_4VC_4$ MXene flake has a thickness of 2.50±0.33 nm. Comparatively, $Ti_3C_2$ (n=2, a MXene with three transition metal layers) has an AFM thickness of 1.60 nm[58]. Reported AFM thickness values include the MXene flake as well as any absorbed water molecules. A cross-sectional view of a film of $Mo_4VC_4$ flakes showing layers of delaminated flakes stacked flat on top of each other is provided in FIG. 17D.

Compositional Characterization

Figure 18:
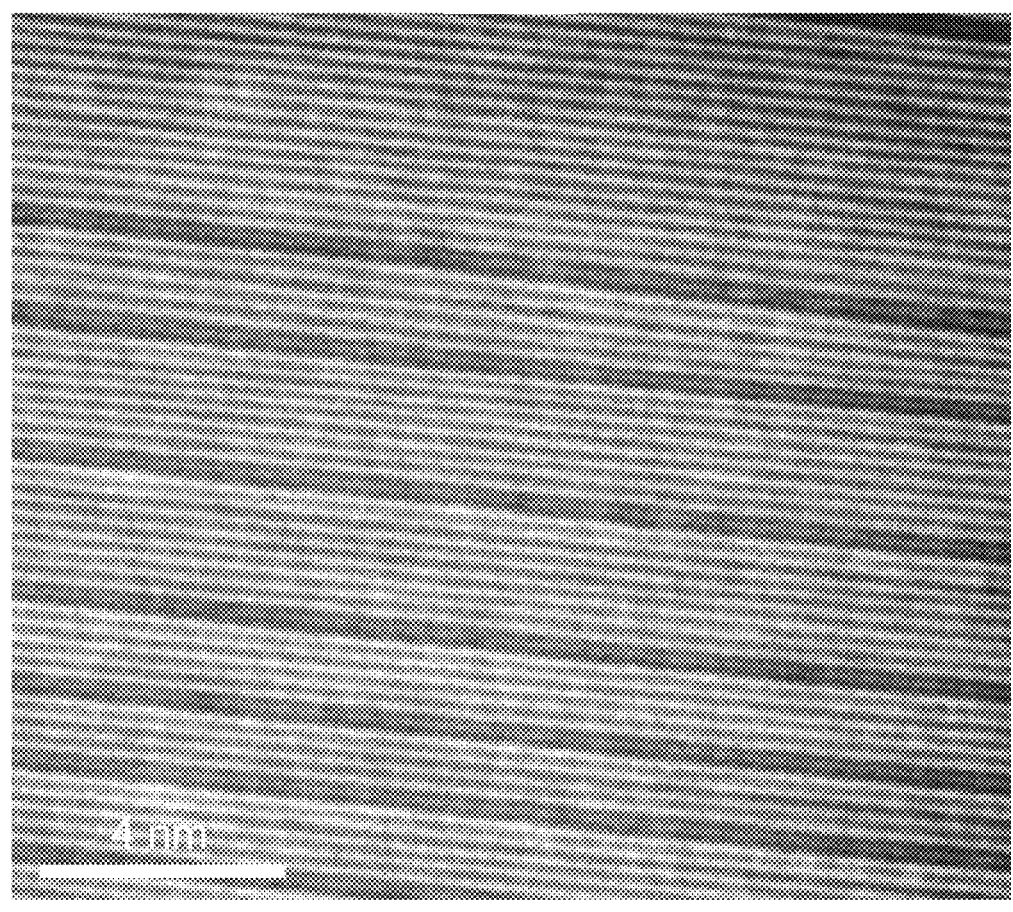
FIG. 18. TEM analysis of $Mo_4VAlC_4$ MAX phase. Micrograph of $Mo_4VAlC_4$ MAX phase containing thicker slabs of Mo/V layers. This is due to a lack of Al layers which agrees with the EDS results that show a lower than stoichiometric amount of Al.

After determining the atomic structure, we turned our attention to the composition. As a qualitative tool, we used EDS to explore the compositions of the $Mo_4VAlC_4$ MAX phase particles after HCl washing, ML $Mo_4VC_4$ MXene particles, and the free-standing film of delaminated MXene (Table 1). Since the MAX powder likely contained binary carbide impurities that remained after HCl washing, EDS was done on particles with a visible layered structure, similar to FIG. 5A. Their measured compositions were averaged. Surprisingly, the atomic percents of aluminum and carbon were lower than stoichiometric amount for the MAX phase. Upon further examination with TEM, is was discovered that in addition to 5-layer slabs of Mo/V sandwiched between Al layers, thicker slabs of Mo/V layers are also present (FIG. 18). There are occasionally slabs of up to 20 Mo/V layers that have been seen. This clarifies why there is a lower than expected Al ratio. The MXene showed no presence of aluminum and instead showed the presence of fluorine and oxygen. This indicates that the etching was successful, and terminations are present on the MXene surface.

Table 1. EDS measurements of Mo:V:Al:C:F:O atomic ratios for the MAX phase (3 particles measured), ML MXene (6 particles measured), and free-standing film of delaminated MXene (5 spots measured). The values shown are atomic percentage normalized so that (MoV)=5. Error is defined as one standard deviation Table 1

| [EDS measurements of Mo:V: Al:C:F:O atomic ratios for the MAX phase (3 particles measured), ML MXene (6 particles measured), and free-standing film of delaminated MXene (5 spots measured). The values shown are atomic percentage normalized so that (MoV) = 5. Error is defined as one standard deviation] | | | | | | |
|---|---|---|---|---|---|---|
| Sample | Mo | V | Al | C | F | O |
| $Mo_4VAlC_4$ | 3.89 ± 0.02 | 1.11 ± 0.02 | 0.29 ± 0.13 | 0.41 ± 0.08 | — | 0.15 ± 0.02 |
| $Mo_4VC_4$ (ML) | 4.06 ± 0.07 | 0.94 ± 0.07 | — | 5.72 ± 0.46 | 0.54 ± 0.03 | 1.83 ± 0.07 |
| $Mo_4VC_4$ (DL) | 4.04 ± 0.04 | 0.96 ± 0.04 | — | 1.80 ± 0.29 | 0.01 ± 0.01 | 0.47 ± 0.12 | plane forming a herring bone-type structure (FIG. 4C). This clarifies why the XRD patterns did not match completely. Further research is required to fully determine the atomic positions and space group of $Mo_4VAlC_4$ MAX and $Mo_4VC_4$ MXene. After etching, the Al is removed and the particles become accordion-like (FIG. 5D). STEM (FIGS. 5E-F) shows the five atomic layers of Mo/V that are no longer sandwiched between layers of Al confirming that successful conversion to $Mo_4VC_4$ MXene was achieved. It is worth noting that $Mo_4VC_4$ MXene retains the herring bone-type structure (FIG. 5F).

While the Mo:V ratio used for synthesizing the $Mo_4VAlC_4$ MAX phase was 4:1, the resulting material had a ratio of $Mo_{3.89}:V_{1.11}$ (Table 1). After the HF treatment, the resulting $Mo_4VC_4$ MXene had a ratio of $Mo_{4.06}:V_{0.94}$. After delamination with TMAOH, the ratio remained about the same—$Mo_{4.04}:V0.96$. The fluctuations in the Mo:V ratio are likely within reasonable error of the EDS detector, which means the selective etching was done for Al layers. The slight change in the Mo/V ratio might also be due to dissolution of some V atoms from the surface layer of the carbide, which agrees with the green color of the solution during the first wash. The amount of fluorine present decreases after delamination. It has been shown previously that TMAOH decreases F content, specifically for the Mo-containing MXenes[60-61]. Nonetheless, the fluorine content before delamination is still significantly lower compared to titanium-based MXenes, which is in agreement with previously reported work indicating that Mo on the surface preferentially bonds with —OH or ═O terminations rather than —F[63].

Figure 19:
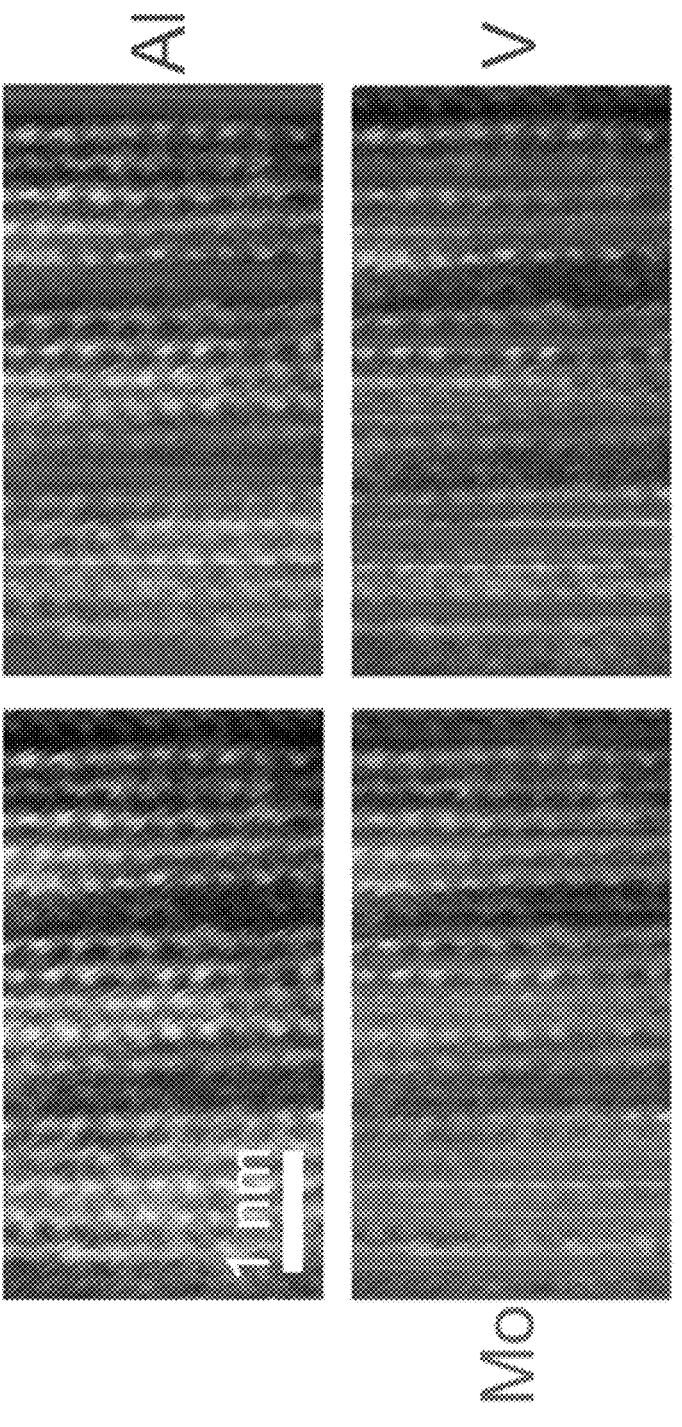
FIG. 19. Atomic-resolution EDS analysis of $Mo_4VAlC_4$ MAX phase. Atomic-resolution EDS line scan of $Mo_4VAlC_4$ that has been extended in-plane and overlaid on the TEM micrograph.

An atomic-resolution EDS spectrum was also obtained to determine whether the Mo/V layers were ordered or disordered solid solutions (FIG. 19). There is a distinct ordering with regard to the Mo/V slabs alternating with Al layers as shown by the periodic Al peaks. The spectra for Mo and V within the slabs did not exhibit any order and therefore it is concluded that the Mo/V layers are solid solutions of Mo and V.

Figure 20:
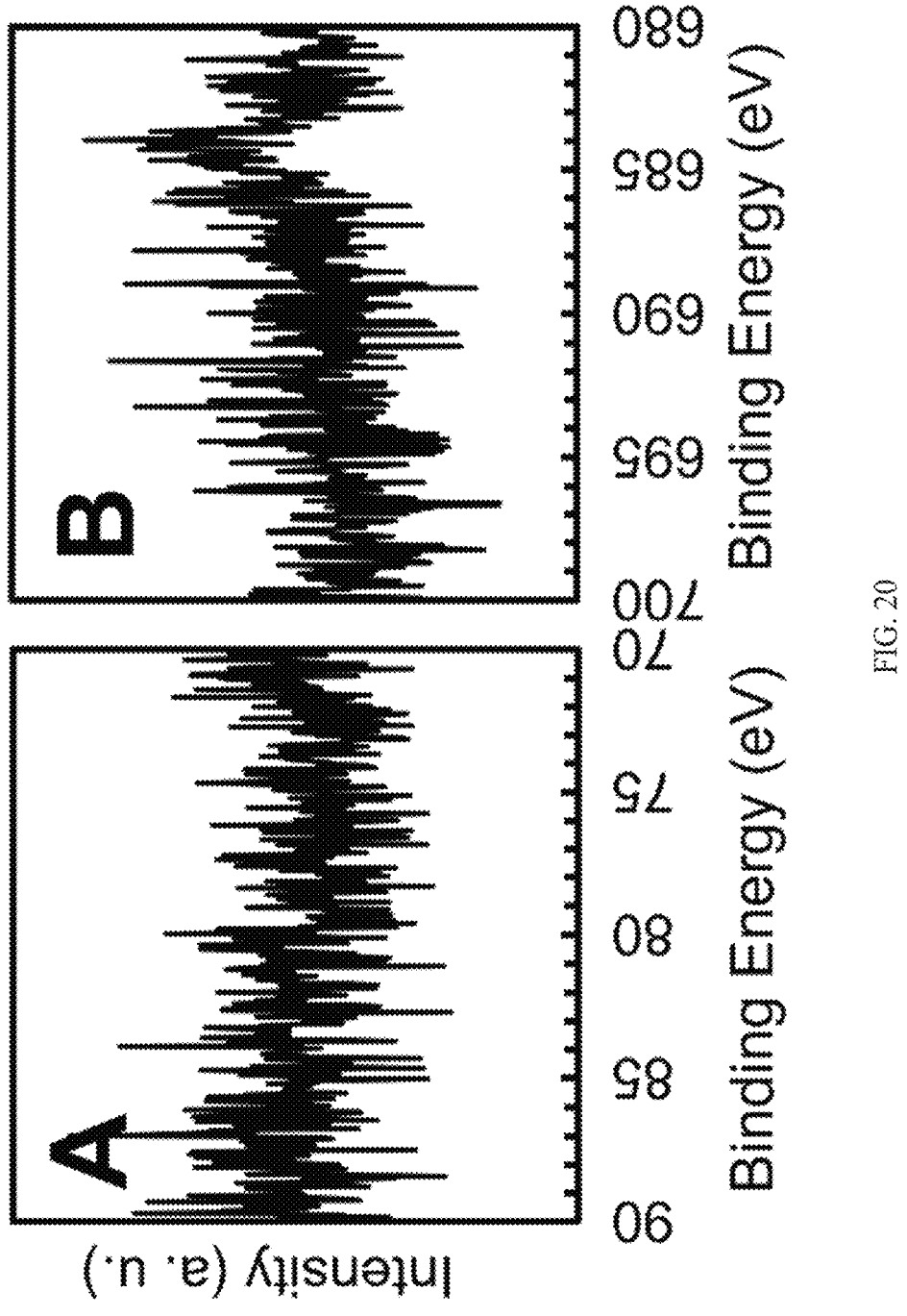
FIG. 20. XPS results of $Mo_4VC_4$ MXene. A) Al 2p region shows no presence of Al. B) F Is region almost no F.

XPS was used to quantify the transition metal ratio, and the C content in $Mo_4VC_4$ MXene and its precursor. XPS of $Mo_4VAlC_4$ MAX phase is discussed herein. The Mo 3d region (FIG. 5A) can be adequately fitted with 2 doublets corresponding to Mo bonded to carbon and surface termination at 228.47 eV (231.68 eV) and Mo in the $Mo^{4+}$ oxidation state at 229.59 eV (232.83 eV), which corresponds to small amount of oxides presented in the free-standing film. Similarly, the V 2p region can also be fitted with 2 doublets centered at 513.38 eV (520.84 eV) and 514.94 eV (522.81 eV) correspond to $V^{2+}$ and $V^{3+}$ states, respectively as shown in FIG. 5B. Both doublets in the V 2p regions are assigned to vanadium bonded to carbon atoms in the MXene structure. The difference in oxidation states of vanadium might come from different surface terminations bonded on the vanadium atom on the surface, which implies V is positioned in different transition metal layers (bonded to C and terminations), another indication of solid solution in the transition metal layers. The C 1s region (FIG. 5C) was fitted by 5 peaks, corresponding to C—Mo/V, C—C, C—H, C—O, and C—OO at 283.15, 284.56, 285.31, 286.48, and 289.12 eV, respectively. The atomic ratio was deduced from the intensity of only the peaks related to MXene, e.g., only C—Mo/V peak in C region was used in this calculation. The calculated ratio was $Mo_{4.10}V_{0.90}C_{2.99}$ which agrees with the ratio of Mo:V obtained from EDS results. The amount of C is below the expected stoichiometry, similar to many MXenes, possibly because of the presence of C vacancies in their precursor MAX phases[64]. This could also be due to a substitution of O for some of the C sites during the synthesis of $Mo_4VAlC_4$ MAX phase. XPS results also indicate that no Al is present after etching and the amount of F surface termination is very small in agreement with our EDS results (~10% of the total surface termination) (FIG. 20A-FIG. 20B).

Figure 6:
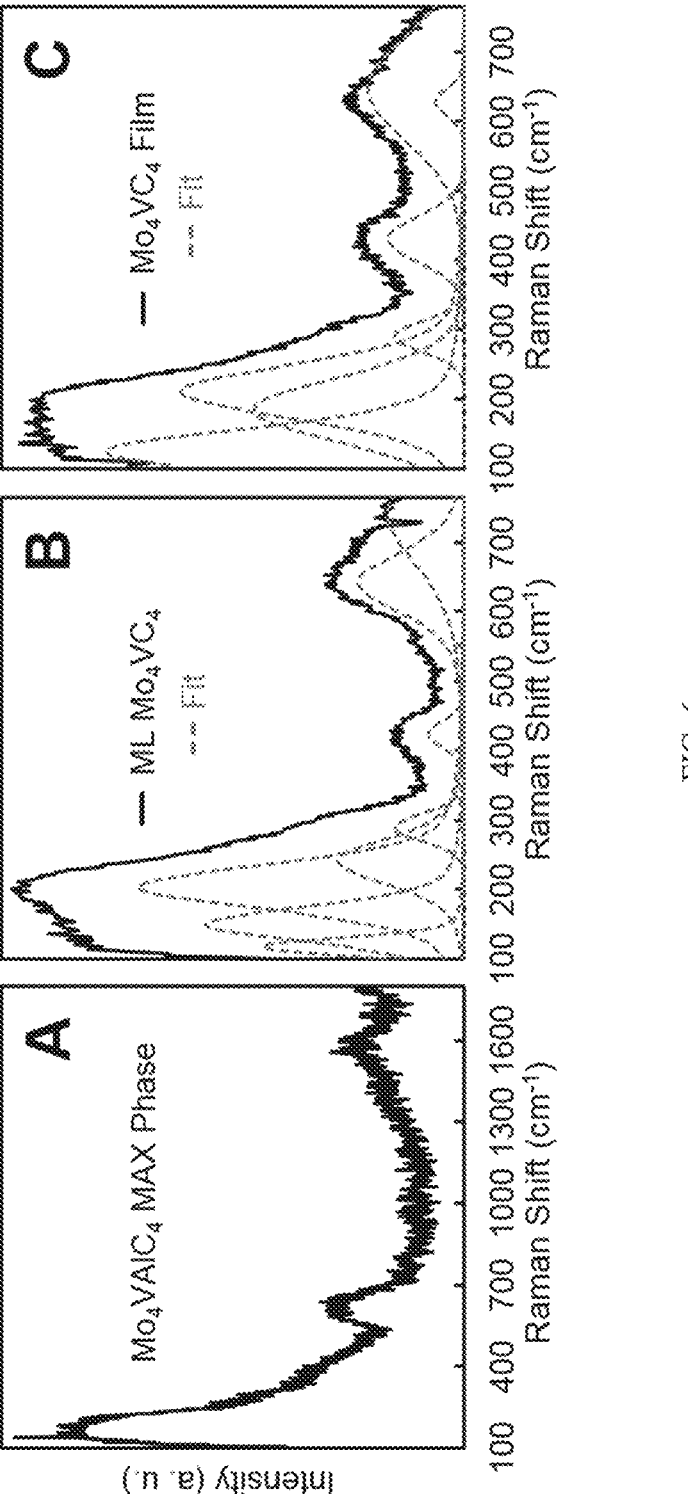
FIG. 6. Raman spectra of MAX and MXene. A) $Mo_4VAlC_4$ MAX phase, B) ML $Mo_4VC_4$ MXene, and C) free-standing film of delaminated $Mo_4VC_4$ MXene.

The Raman spectra of $Mo_4VAlC_4$, ML $Mo_4VC_4$ and a free-standing film of delaminated $Mo_4VC_4$ MXene (FIG. 6) show broad peaks in the range below 1000 $cm^{-1}$ that correspond to vibrations of metals with oxygen and carbon. In contrast, Raman spectra of ordered MXenes $Mo_2TiC_2$ and $Mo_2Ti_2C_3$ exhibit sharp bands in the region below 1000 $cm^{-1}$ [27]. Since Raman vibrations in solids represent the vibrations of a unit cell, distortions of neighboring unit cells due to varying M-elements will lead to broadening of Raman peaks due to different frequencies of the vibrations[65]. Moreover, since Raman bands depend on the element's mass, broadening will be even more pronounced when the interchangeable elements have an increasing difference in mass. This again confirms that there are solid-solutions on the M sites within the MAX and MXene structure. Additionally, traces of free carbon are observed in the MAX phase sample (the peak at about 1800 $cm^{-1}$).

Thermal Analysis

The thermal behavior of a $Mo_4VC_4$ film was determined by thermogravimetric analysis (TGA) coupled with mass spectrometry (MS) under Ar flow. The thermogram (FIG. 7A) shows several significant drops in the weight of the sample upon heating. The weight loss step, which peaked at 125° C., is due to the removal of $H_2O$ molecules that were trapped in between the $Mo_4VC_4$ flakes from the filtration of the MXene colloid as shown by the $H_2O$ and $OH^-$ peaks in the mass spectrograph (FIG. 7B). The XRD pattern of a sample treated at 150° C. under Ar flow (FIG. 7C) reveals a shift in the (002) peak indicating a decrease in c-LP of 4 Å from the as prepared sample. This is due to the compaction of the flakes after the $H_2O$ removal. The amount of compaction indicates that possibly two layers of $H_2O$ molecules were present as the molecular radius of $H_2O$ is ~2.75 Å. The second weight loss step, which peaked at 342° C., is due to the removal of residual TMAOH between the flakes as shown by the $NH_2^-$, $CO_2$, CO, OH, and $H_2O$ peaks in the mass spectra (FIG. 7B).

For a sample treated at 500° C. under Ar flow, there is another shift in the (002) peak indicating a decrease in c-LP of 3.8 Å from the sample treated at 150° C. and a total of 7.8 Å decrease in c-LP from the as prepared sample (FIG. 7C). This amount of decrease in c-LP from as prepared to treated at 500° C. is smaller than those reported for $Mo_2C$ (17.9 Å), $Mo_2TiC_2$ (13.3 Å), and $Mo_2Ti_2C_3$ (15 Å), possibly because those MXenes were delaminated with tetrabutylammonium hydroxide which has a larger radius of 8-9.9 $Å^{27}$.

The removal of additional water suggests that some is retained even after the weight loss step at 125° C. The ionic radius of TMA+ is 3.2 Å, which indicates that there is likely one layer of TMA+ ions between the layers with some retained $H_2O$.

Overall, our TGA-MS results show that $H_2O$ and $TMA^+$ ions occupy similar amounts of space between the MXene flakes. The temperatures for the removal of residual $H_2O$ and TMAOH are in agreement with previously reported results for another Mo-containing MXene; $Mo_2C$.[24] Our results indicate that Mo-containing MXenes have similar thermal behaviors due to similar bonding strengths between Mo and molecules on the surface, but these behaviors have been shown to be different than MXenes with other M elements. The next weight loss began at ~505° C. and was indicated by C leaving the structure as CO. This is similar to the behavior exhibited by $Mo_2C$. After the heat treatment at 900° C. under Ar flow, after the next two peaks (638° C. and 742° C.) that occur immediately after each other (FIG. 7A), the resulting material is no longer $Mo_4VC_4$ MXene and it is instead transformed, as marked on the bottom pattern in FIG. 7C.

Electrical and Optical Properties

Figure 7:
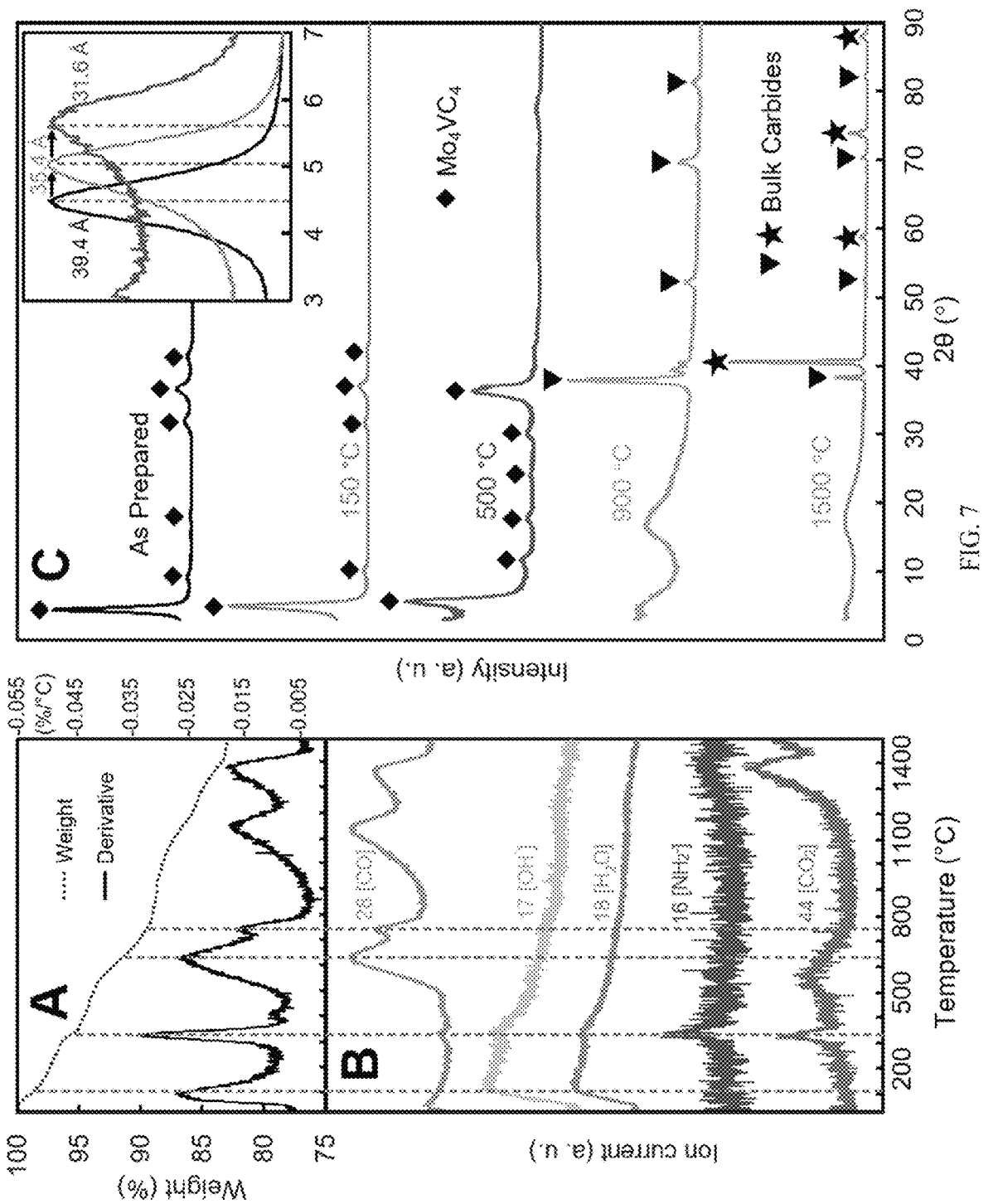
FIG. 7. Temperature dependent changes in $Mo_4VC_4$. A) Thermogravimetric analysis of $Mo_4VC_4$ MXene film. The sample experienced 6 drops in its weight due to water, OH— termination groups, TMAOH, and the MXene decomposition. B) Mass spectrometry results indicating the removal of $CO$, $OH^-$, $H_2O$, $CH_3{}^+$, $NH_2{}^-$, and $CO_2$ from the MXene film that correspond to the sample's weight loss. C) XRD patterns of the resulting material after the drops in sample weight. Inset shows a close view of the peak shift in the XRD pattern of the material as prepared, heated to 150° C., 500° C., and 900° C. with their respective c-LPs. The broad peaks at ~20° in the 900° C. and 1500° C. patterns are due to double-sided tape that was used to hold the film pieces to the glass slide for XRD.

The electrical resistivity of an as-prepared $Mo_4VC_4$ free-standing film was measured with a 4-point probe. Each film's thickness and resistivity values were quite uniform (standard deviation=0.82 μm and 0.10 mΩ cm respectively). The resistivity was measured to be 4.18 mΩ cm (conductivity 240 S/cm). To remove the effects of water and TMAOH intercalants, the as-prepared sample was heated at 500° C. in an Ar atmosphere for 5 h. We chose 500° C. annealing temperature based on our TGA results (FIG. 7). After heat-treatment, the sample's electrical resistivity decreased to 1.20 mΩ cm (conductivity 833 S/cm). This electrical resistivity is similar to another Mo-based MXene, $Mo_2Ti_2C_3$ (1.63 mΩ cm). Interestingly, two thinner Mo-based MXenes, $Mo_2C$ and $Mo_2TiC_2$ have much lower resistivities of 0.80 m$\Omega$ cm and 0.67 m$\Omega$ cm, respectively. It is expected that a thicker MXene would have a lower resistivity due to additional paths for electrons to travel within a flake, however, this is not the case for the film measured here. We hypothesize that due to the increased thickness of $Mo_4VC_4$, the flakes are probably more rigid and might not stack well and might have gaps between adjacent flakes leading to less conductive paths. In other words, this can be due to the inter-flake resistivity than the intra-flake resistivity. Measurements on single flakes of MXene will be required to clarify this issue.

The electrical resistivity of $Mo_4VC_4$ films as a function of temperature was measured after drying at 150° C. in a vacuum oven and annealing at 500° C. under an Ar atmosphere. The results (FIG. 8A) show that the resistivity gradually increases as temperature decreases. The trend was similar for both samples, although the sample annealed at 500° C. had a slightly lower absolute resistivity. Interestingly, the room-temperature resistivity of this MXene only reduced by ~0.4 m (2 cm after annealing at 500° C. This potentially indicates that large d-spacing caused by TMAOH intercalation does not largely affect the electron transport property of this MXene, unlike what was observed for $Ti_3CN$ MXene, where an order of magnitude reduction in room-temperature resistivity was observed after annealing at 400° C.[26]. The smaller decrease in resistivity could also be due to poor stacking of thick and rigid $Mo_4VC_4$ flakes, so that even after annealing, the flakes do not align well, having poor connections with neighboring flakes. The effect of TMAOH on temperature-dependent resistivity can be seen by comparing the overlaid temperature-dependent resistivity curves for as produced and annealed MXene (FIG. 21A). The trend is similar although the 500° C.-annealed sample exhibits a less drastic increase in resistivity with decreasing temperature. The abrupt increase of the resistivity seen in the 150° C.-annealed sample (black curve) at ~250 K is most likely due to freezing of the remaining water and TMAOH molecules.

Figure 8:
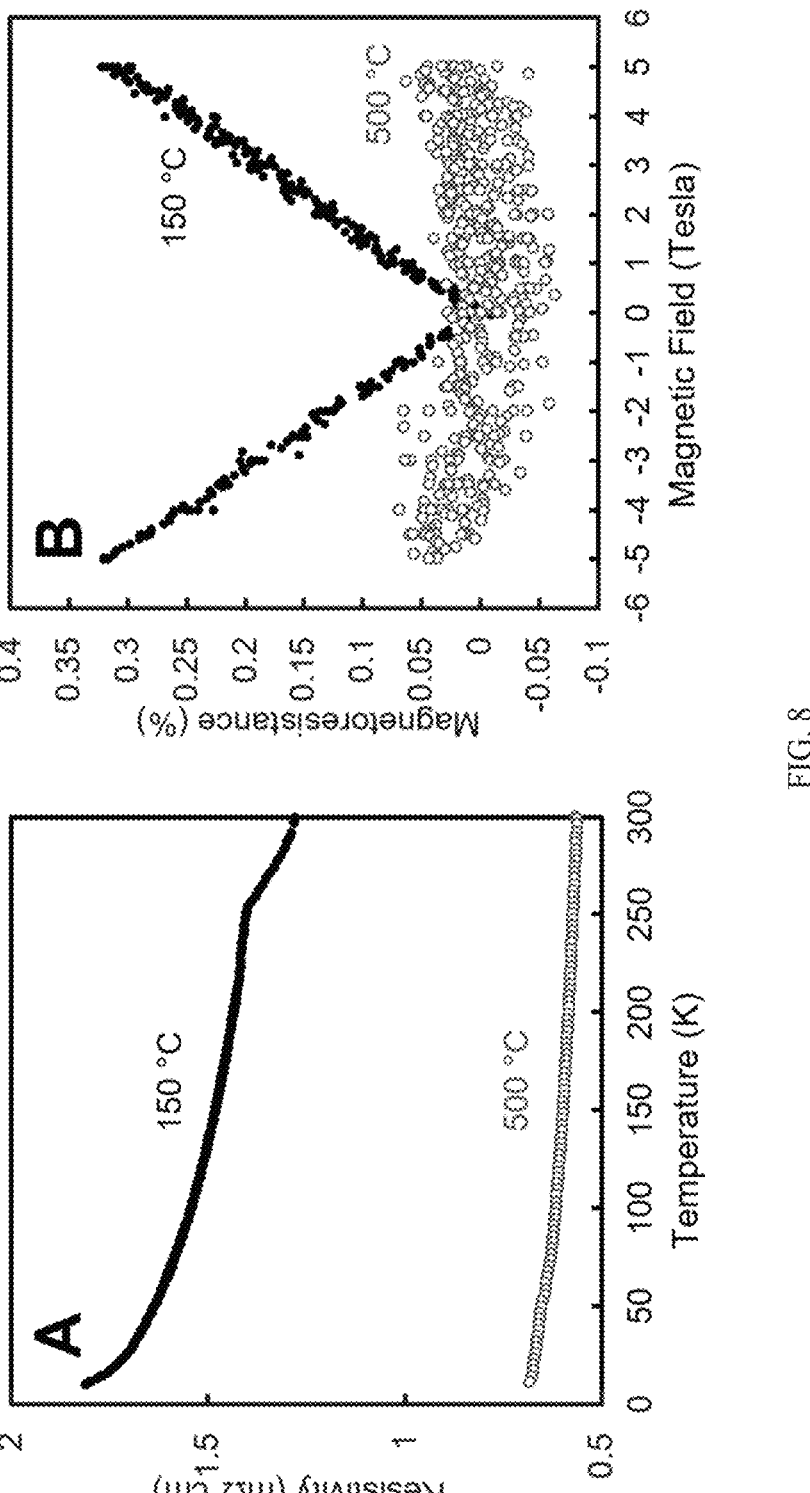
FIG. 8. Temperature-dependent electrical properties of MXene. A) Electrical resistivity as a function of temperature for $Mo_4VC_4$ annealed at 150° C. and 500° C. B) Magnetoresistance of $Mo_4VC_4$ under an external magnetic field perpendicular to the sample surface.

The magnetoresistance was measured at 10 K with a magnetic field up to 5 Tesla applied perpendicular to the sample surface. $Mo_4VC_4$ exhibits a positive MR as shown in FIG. 8B, which is similar to other Mo-containing MXenes,[60-61] while many other MXenes exhibit a negative MR[60,68]. The reason for the positive MR observed in Mo-containing MXenes is currently unclear. However, the strength of magnetoresistance was almost negligible for the sample annealed at 500° C. This indicates that the magnetoresistance might be related to inter-flake electron transport rather than an intrinsic property of the MXene flakes. Hall measurements of both samples at 10 K indicates carrier concentration of 2.52×10[22] cm[-3] and 1.37×10[22] cm[-3] for the 150° C.- and 500° C.-annealed samples, respectively. Both samples exhibit negative Hall slope (FIG. 21B) suggesting that electrons are the major carrier. Carrier mobility increases from 0.10 cm[2]/V s for the 150° C.-annealed samples to 0.36 cm[2]/V s for the 500° C.-annealed samples, mostly likely due to less scattering in the absence of TMAOH and water.

Figure 22:
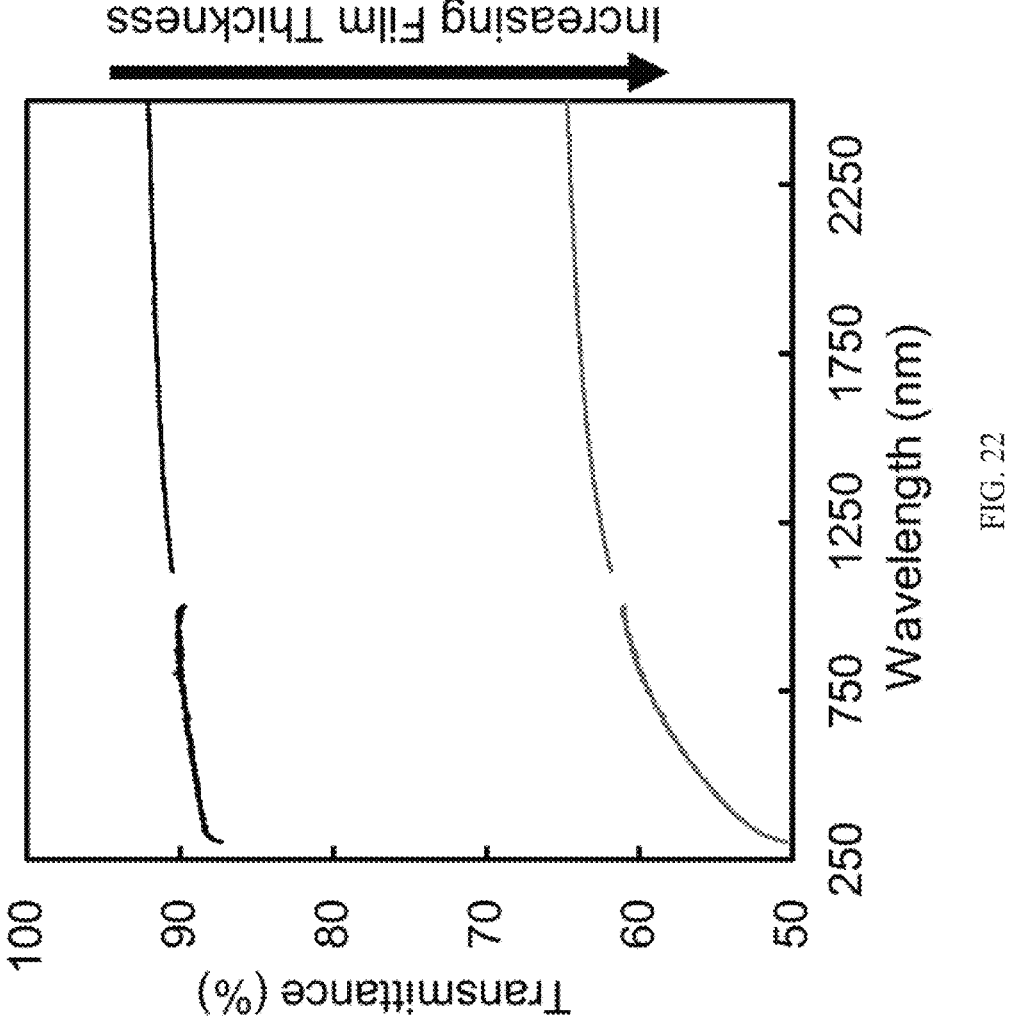
FIG. 22. UV-Vis-NIR transmittance spectra from 300 to 2500 nm of $Mo_4VC_4$ spray coated onto glass substrates as a function of increasing the spray coating amount/thickness.

Delaminated $Mo_4VC_4$ solutions were deposited onto glass substrates using a spray coating method to screen the optical properties. As determined via UV-vis-NIR spectroscopy, with multiple spray coatings, there is a decrease in transparency observed across all measured wavelengths (FIG. 22). MXenes with an n value of 1 or 2, such as $Ti_2C$, $V_2C$ and $Ti_3C_2$ interact with light within the visible spectrum. For $Ti_3C_2$, this is indicated by a broad extinction peak between 700 and 800 nm and strong decrease in transparency in the infrared region[14]. $Mo_4VC_4$ exhibits a featureless absorption spectrum from the visible to near infrared range (400 to 2500 nm), hinting at fundamental differences in how the material interacts with electromagnetic radiation compared to MXenes with a n value of 1 or 2. Due to the featureless spectrum, a potential application of this material could include fabricating low loss and high optical figure of merit (FOM) transparent conducting electrodes, however this will require optimization of the thin film quality, electrical conductivity, and normalization of transmission with regard to thickness.

Density Functional Theory

Figure 5:
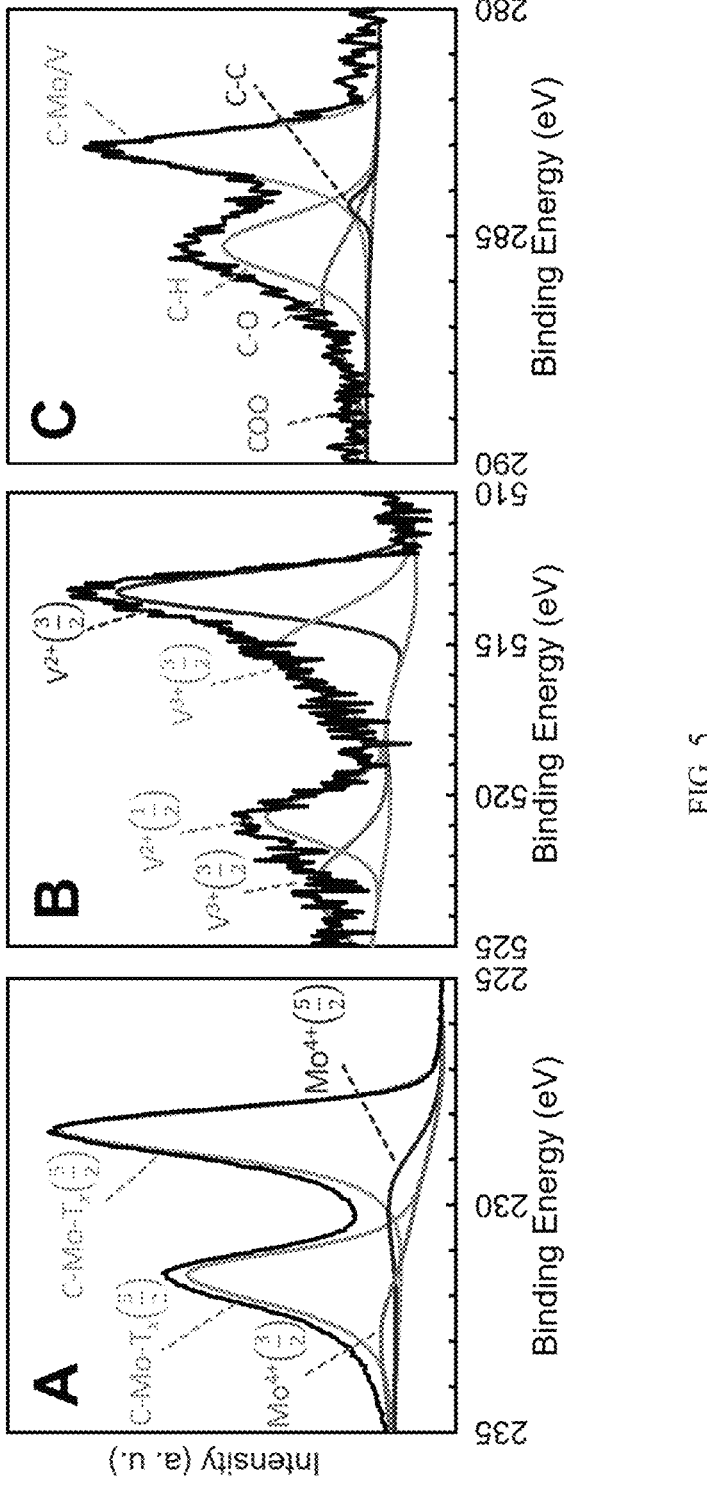
FIG. 5. High-resolution XPS spectra of a $Mo_4VC_4$ free-standing film. A) Mo 3d. B) V 2p. C) C 1s regions.
Figure 9:
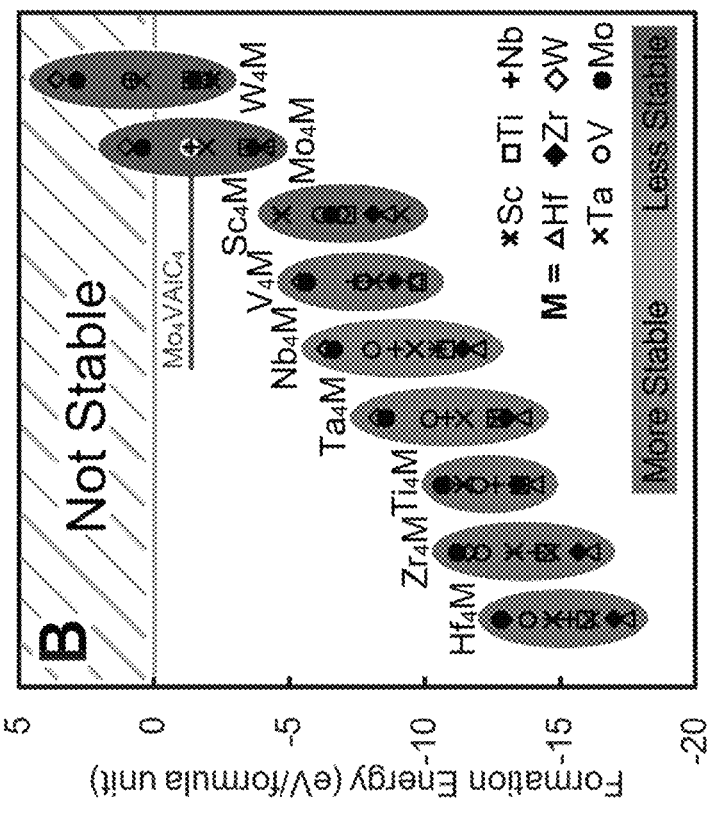
FIG. 9. DFT predictions of MAX phases and MXenes. A) Formation energies for solid solution $Mo_4VAlC_4$ configurations (black dots) compared to ordered $Mo_4VAlC_4$ (purple diamond). B) DFT calculated formation energies of ordered $M'_4M''AlC_4$ MAX phases. Most are predicted to be stable except for some Mo and W compositions.
Figure 9:
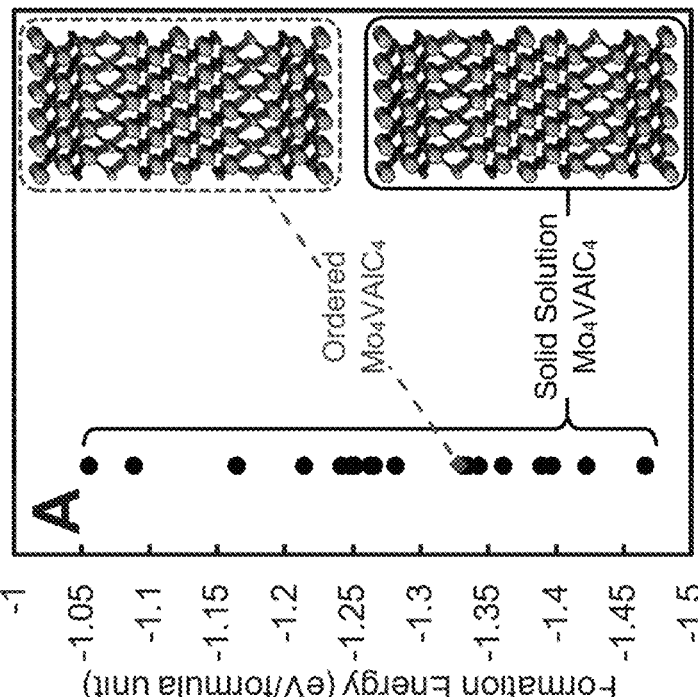
Figure 23:
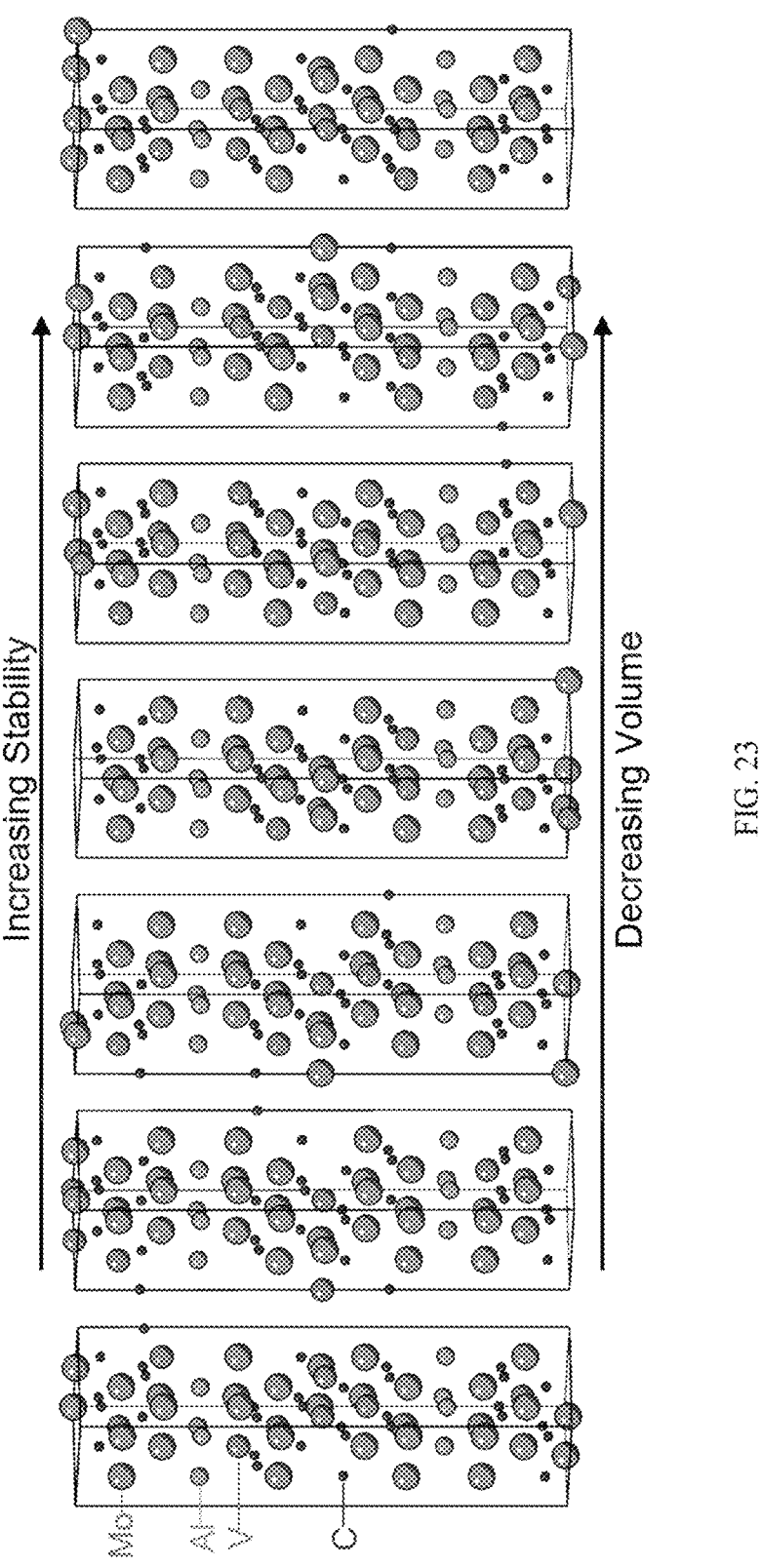
FIG. 23. Seven examples of the solid solution $Mo_4VAlC_4$ structures for which the formation energies were calculated. As the volume of the structure decreases, the stability tends to increase.

DFT calculations were performed to determine the preferred termination groups that can exist on the surface of $Mo_4VC_4$ MXene. The results of these calculations indicate that —OH is the most preferred termination group with –9.10 eV formation energy. =O and —F terminations are not as stable (–5.39 eV and –6.56 eV respectively) which agrees with the experimental results presented here (FIG. 5). DFT calculations were then used to determine the stabilities of 18 quasirandom solid solution configurations as well as an ordered configuration with one layer of V sandwiched between 4 layers of Mo (two layers of Mo on each side as shown in FIG. 9A). Examples of these quasirandom structures are provided in FIG. 23. Each of these phases were predicted to be stable, in agreement with experimental results. For $Mo_4VAlC_4$, there are solid solution configurations that are more stable than an ordered configuration, thus it is more probable for $Mo_4VAlC_4$ to exist as a solid solution.

DFT calculations were also performed to determine the thermodynamic stability of other $M_5AlC_4$ MAX phases. Specifically, the formation energies of ordered $M'_4M''AlC_4$ compositions were calculated where M' and M'' were Hf, Zr, Ti, Ta, Nb, V, Sc, Mo, and W. A summary of the predicted stability of these phases is shown in FIG. 9B. The exact formation energy values are provided in the table below. It is expected for many of the compositions examined here, that there may be at least one solid solution structure that is more stable than the compositionally equivalent ordered structure. We present calculations for ordered MAX structures as a simple benchmark and many of their compositionally equivalent $M'_4M''AlC_4$ solid solution phases will likely be even more stable.

Interestingly, other phases studied, such as ordered phases containing Hf, Zr, and Ta, are predicted to be more stable than the synthesized $Mo_4VAlC_4$. The effect that the M' element has on the stability was determined to be much greater than that of M''. W- and Mo-containing compositions are the least stable and are the only two M' elements that produce some unstable compositions. For both Mo- and W-based MAX phases specifically, it is known that Mo and W avoid stacking with C in a face center cubic structure (FCC), so adding another M element can allow for Mo- and W-based MAX/MXene to be synthesized as the additional M element will occupy some of the FCC sites thus relieving stress within the crystal structure. However, here we considered only ordered phases in FIG. 9B and compositions predicted to be unstable may still have other stable solid solution configurations. These calculations also show that most of the M elements can achieve a higher stability when they are combined with another M element. The only exception to this is Hf which is most stable when M'=M''. Worth noting are the specific elements that best stabilize the material. Higher stability occurs when Hf, Zr, Ti, and Ta are the M' or M'' element. This agrees with previous work where these elements were predicted to stabilize MAX phases, and the lower formation energies were correlated with the difference in ionic radius between the M atoms. MAX phases with M=Cr, Mn are reserved for a future study, as we expect many of these phases have stable magnetic ground states and a more detailed study is needed to properly characterize these systems.

These calculations show that there is potential for expansion to other $M_5AlC_4$ MAX phases, allowing for more $M_5X_4$ MXenes to be produced. It is important to note that while many of these ordered $M'_4M''AlC_4$ phases were determined to be stable compared to their respective unary phases, there may be binary carbides, intermetallics, or other competing MAX phases that are more stable for these compositions. Full evaluation of the possibilities for new $M'_4M''X_4$ MXene synthesis requires solid solution calculations, precise determination of this 5-layered crystal structure, dynamical and phase stability analysis[72], and calculating exfoliation energies[46]. However, the results presented here give insight into the stability trends of $M'_4M''AlC_4$ MAX phases and indicate the huge space of new promising structures to explore via computation and machine learning[73] to accelerate the expansion of the MXene family.

Additional Disclosure $Mo_4VAlC_4$ MAX Phase Synthesis and Washing

To explore the entire $(MoV)_5AlC_4$ system, we mixed samples covering the whole range from 0-100% Mo (FIG. 10A). It was found that only the $Mo_4:V_1$ ratio sample resulted in the desired $M_5AX_4$ phase. The other ratios either resulted in other MAX phases or carbides (FIG. 10B). To more closely examine the impact of Mo:V ratio, additional samples were mixed with $Mo_x:V_{5-x}$ ratios of x=3.50, 3.75, 4.00, 4.25, and 4.50, of which those where X=3.75, 4.00, and 4.25 resulted in $(MoV)_5AlC_4$ although the 3.75:1.25 sample contained $(MoV)_4AlC_3$ as an impurity. Those where x=3.50 and 4.50 resulted in $M_4AX_3$ MAX phase and bulk Mo/V carbides respectively. FIG. 11 shows how the c- and a-LPs are affected by the Mo:V ratio. The (002), (004), and (006) peaks define expansion or compaction in the MAX phase unit cell and, as shown by FIGS. 11A-C, there is no significant shift in their peak positions. This seems to indicate that if there are varying amounts of Mo and V in the structure, it will not significantly expand or contract in the c direction. FIG. 11D shows the (110) peak, which indicates the a-LP. There is indeed a noticeable shift as the Mo:V ratio increases. From a Mo:V ratio of 3.75:1.25 to 4.25:0.75 there is an expansion in the a-LP of about 0.27% (0.8 pm). The expected percentage expansion for this increase in Mo:V ratio based on the ratio of Mo:V atomic radii, which is 1.03%. It is hypothesized that due to the presence of $(MoV)_4AlC_3$ with an unknown Mo:V ratio, and slight errors in the initial weighing of the elemental powders, the amount of Mo:V ratio in the $(MoV)_5AlC_4$ structure will be slightly different which would lead to a sample that experienced more or less expansion than expected. This indicates that the ratio can be varied, which implies that the structure is a solid solution on the M sites.

While the MAX phase sample powder contained only one type of MAX phase, there were additional impurities present. To remove some of these, namely $Al_4C_3$, the powder was washed with 12 M HCl. XRD confirms the removal of $Al_4C_3$ after washing (FIG. 12).

Interestingly, $V_2O_3$ is required in the initial mixing powder to form the $Mo_4VAlC_4$ phase. As for the V source, we used $V:V_2O_3$ 0.9:0.05 instead of pure V in the starting powder mixture for the MAX synthesis. Without the addition of $V_2O_3$ the resulting material contains $Mo_2C$ and VC (FIG. 13). It is not clear why $V_2O_3$ is needed but the oxygen might act as a catalyst for this reaction, substituting for carbon on the lattice forming oxicarbide, or potentially the extra heat produced during the thermal reduction of $V_2O_3$ by Al pushes the sample into the $(MoV)_5AlC_4$ region of this quaternary phase diagram.

The mixture of elemental and oxide powders (molybdenum (99.9% Alfa Acsar, −250 mesh), vanadium (99.5% Alfa Acsar, −325 mesh), vanadium (III) oxide (98% Sigma Aldrich), aluminum (99.5% Alfa Aesar, −325 mesh), and graphite (99% Alfa Aesar, −325 mesh)) was divided into 7 g quantities that were each poured into 10 mL alumina crucibles. To compact the powder in the crucibles, they were each tapped gently on the counter 80 times, rotating the crucible 90 degrees after every 20 taps to ensure a level top for even heating.

To wash the MAX after the HCl treatment, 50 mL of HCl/MAX phase mixture was poured into a 50-mL centrifuge tube and centrifuged at 3500 rpm (2550 rcf) for 2 min. Afterwards, the MAX phase particles had settled to the bottom of the centrifuge tube as sediment and the supernatant was transparent. There were also many particles of PTFE floating in the solution. This is due to the high hardness of the MAX phase sample powder which wears away the PTFE stir bars. These particles should be skimmed off to avoid contamination of the sample. This supernatant was decanted off into an appropriate HCl waste bottle. Fresh DI water was added to the tube and, after securing the cap, the tube was hand-shaken to re-disperse the MAX phase sediment. The same centrifugation and decantation procedure was repeated 4 additional times to neutralize the MAX phase.

$Mo_4VC_4$ Multilayer MXene Washing

The 40 mL of HF/MXene solution was poured into a 250 mL centrifuge tube. Additional DI water was added to fill the tube. The tube was centrifuged at 3500 rpm (2550 rcf) for 3 min. Afterwards all the ML MXene had settled to the bottom of the tube and the supernatant was transparent with a slight tint of green due to dissolved vanadium oxide (FIG. 14A). Again, PTFE particles are present and float to the top. This supernatant was decanted off into an appropriate HF waste bottle. Fresh DI water was added to the tube and, after securing the cap, the tube was hand-shaken to re-disperse the ML MXene sediment. The same centrifugation and decantation procedure was repeated and the resulting supernatant was transparent and colorless (FIG. 14B). The washing procedure was repeated 3 additional times with the centrifugation step lasting 15 min to neutralize the ML MXene. Each subsequent supernatant was also colorless.

$Mo_4VC_4$ MXene Delamination Washing

A more aggressive centrifugation cycle was needed to wash the delaminated SF MXene. Washing can still be done at 3500 rpm (2550 rcf) however it takes much longer to settle the MXene flakes. Typically, at 3500 rpm (2550 rcf), each washing cycle is >1 h. Since the solution heats up during this long centrifugation, in between washes, the solution should be cooled back down in a refrigerator for 10 min before the next centrifugation to avoid oxidation and degradation of the flakes. Ideally, centrifugation can be done at 8000 rpm (8230) ref) for 30 min cycles. For delaminating 0.25 g of ML MXene, 5 washes are needed to achieve a neutral pH.

$Mo_4VC_4$ MXene Delamination Optimization

As a part of optimizing the delamination procedure, various concentrations of TMAOH were used to delaminate samples. TMAOH can lead to degradation of the MXene flakes so ideally the lowest TMAOH concentration possible that still produces a reasonable yield (>1 mg/mL) should be used. After washing each sample to neutral pH, the sediment was bath sonicated for 1 h with Argon bubbling. Each sample, containing 30 mL of solution, was centrifuged at 3500 rpm (2550 ref) for 1 h to obtain a dark supernatant. After centrifugation, the supernatants were carefully removed with a 3 mL pipette and transferred into a vacuum-assisted filtration setup. The resulting films were dried in a vacuum desiccator overnight and then weighed with a Mettler Toledo UMX2 Ultra-microbalance to determine the mass yield of each TMAOH concentration. After testing 6 different concentrations ranging from 1-25 wt. %, all samples had roughly the same yield (FIG. 15).

FIG. 19 shows an atomic-resolution EDS scan of $Mo_4VAlC_4$ MAX phase. EDS indicates that the Al layers are ordered with the Mo/V slabs in agreement with the varying intensity between the expected Al and Mo/V layers in the HRSTEM micrographs. EDS also indicates a lack of order within the 5-layer Mo/V slabs thus confirming that the structure contains a solid solution on the M sites.

$Mo_4VAlC_4$ X-ray Diffraction Data

Table 2. Peak positions and normalized intensities from the XRD pattern of the $Mo_4VAlC_4$ MAX phase sample powder. The d spacings of each peak are also provided

TABLE 2

| 2θ (°) | d Spacing (Å) | Normalized Intensity | 2θ (°) | d Spacing (Å) | Normalized Intensity | 2θ (°) | d Spacing (A) | Normalized Intensity |
|---|---|---|---|---|---|---|---|---|
| 6.26 | 14.108 | 0.299 | 55.05 | 1.667 | 0.080 | 93.98 | 1.053 | 0.080 |
| 12.58 | 7.031 | 0.215 | 56.88 | 1.617 | 0.098 | 94.27 | 1.051 | 0.059 |
| 18.92 | 4.687 | 0.275 | 58.18 | 1.584 | 0.219 | 95.47 | 1.041 | 0.056 |
| 20.97 | 4.233 | 0.113 | 61.99 | 1.496 | 0.345 | 97.99 | 1.021 | 0.056 |
| 22.97 | 3.869 | 0.091 | 62.50 | 1.485 | 0.148 | 99.58 | 1.009 | 0.075 |
| 25.37 | 3.508 | 0.109 | 64.11 | 1.451 | 0.119 | 101.42 | 0.995 | 0.114 |
| 27.02 | 3.297 | 0.108 | 68.67 | 1.366 | 0.136 | 101.78 | 0.993 | 0.093 |
| 31.85 | 2.807 | 0.190 | 70.54 | 1.334 | 0.204 | 103.95 | 0.978 | 0.079 |
| 34.65 | 2.587 | 0.126 | 71.49 | 1.319 | 0.069 | 104.37 | 0.975 | 0.074 |
| 35.15 | 2.551 | 0.427 | 72.66 | 1.300 | 0.062 | 104.61 | 0.973 | 0.069 |
| 35.88 | 2.501 | 0.105 | 73.44 | 1.288 | 0.084 | 105.03 | 0.971 | 0.114 |
| 35.89 | 2.500 | 0.101 | 74.30 | 1.276 | 0.152 | 105.35 | 0.969 | 0.120 |
| 36.76 | 2.443 | 0.704 | 74.54 | 1.272 | 0.348 | 106.67 | 0.960 | 0.127 |
| 37.16 | 2.418 | 0.371 | 74.75 | 1.269 | 0.207 | 107.07 | 0.958 | 0.124 |
| 38.46 | 2.339 | 0.765 | 75.42 | 1.259 | 0.218 | 108.19 | 0.951 | 0.082 |
| 39.42 | 2.284 | 0.613 | 75.94 | 1.252 | 0.130 | 109.1 | 0.946 | 0.097 |
| 39.76 | 2.265 | 1.000 | 76.22 | 1.248 | 0.142 | 109.63 | 0.942 | 0.096 |
| 42.88 | 2.107 | 0.513 | 77.34 | 1.233 | 0.117 | 110.16 | 0.939 | 0.121 |
| 43.40 | 2.083 | 0.420 | 78.29 | 1.220 | 0.127 | 113.73 | 0.920 | 0.125 |
| 46.97 | 1.933 | 0.131 | 78.52 | 1.217 | 0.097 | 114.12 | 0.918 | 0.090 |
| 47.73 | 1.904 | 0.135 | 82.53 | 1.168 | 0.094 | 116.9 | 0.904 | 0.068 |
| 52.77 | 1.733 | 0.089 | 90.31 | 1.086 | 0.070 | | | |

In addition to the yield of the delamination method, the quality of the resulting flakes is also important. Some of the colloid of each of these samples was drop-cast onto porous alumina substrates and SEM was used to determine the apparent quality of the flakes. These samples are shown in FIG. 16. The samples delaminated with 15, 20, and 25 wt. % TMAOH resulted in the formation of flakes ~750 nm in lateral size, however, holes appeared. The sample delaminated with 1 wt. % TMAOH had no holes but the flake size was smaller (~640 nm). Additionally, 5 wt. % TMAOH results in both smaller flakes (~480 nm) and some holes. Therefore, 10 wt. % TMAOH was chosen as the optimal concentration to produce larger $Mo_4VC_4$ flakes (~700 nm) with the least degradation.

Microscopy

FIG. 17A shows a dark-field STEM micrograph of $Mo_4VAlC_4$. FIGS. 17B-C shows TEM micrographs of a drop cast single flake of $Mo_4VC_4$. One of the flakes edges is oriented parallel to the beam allowing for observation of the 5 atomic layers of Mo/V. The micrograph quality is limited due to the sensitivity of the single flake to the electron beam. A SEM micrograph of the cross-section of a film produced by filtering the colloid produced by delamination is provided in FIG. 17D. The flakes arrange themselves flat along their basal planes and stack on top of each other.

DFT Calculations

Figure 21:
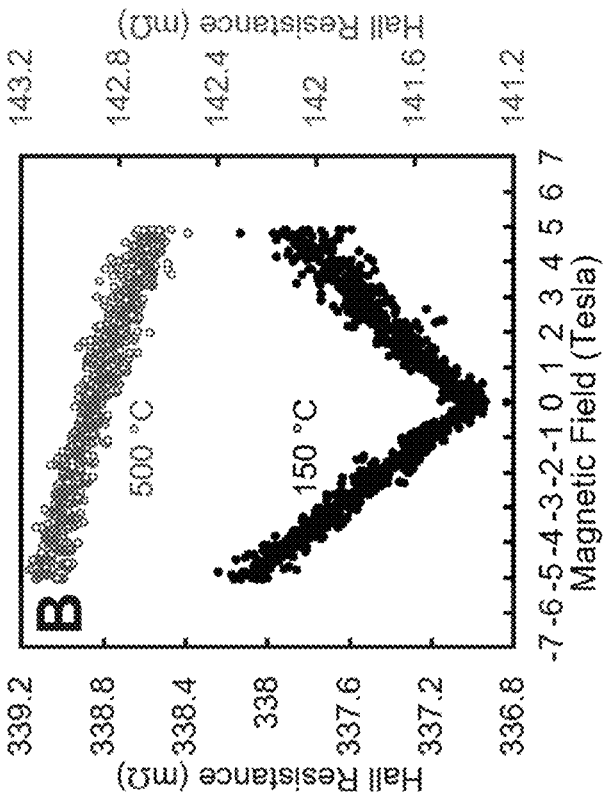
FIG. 21. Low-temperature measurements. A) Overlaid electrical resistivity as a function of temperature for $Mo_4VC_4$ MXene heat treated at 150° C. and 500° C. B) Hall resistance of $Mo_4VC_4$ MXene heat-treated at 150° C. and 500° C. measured at 10 K.
Figure 21:
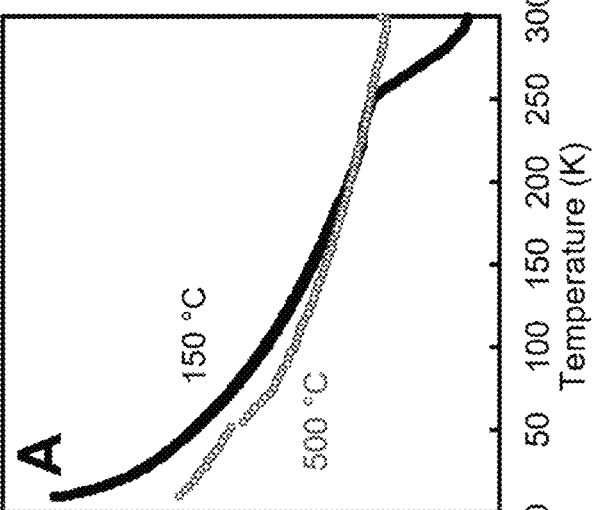

Examples of the solid solution structures used for the $Mo_4VAlC_4$ calculations are provided in FIG. 21. The stability tends to increase with a decrease in the volume of the structure. Calculated formation energies and lattice parameters of ordered $M'_4M''AlC_4$ MAX phases are provided in the appended tables.

Here we report $Mo_4VC_4$, the first MXene with 9 atomic layers (5 transition metal and 4 carbon/nitrogen). We also present its precursor $Mo_4VAlC_4$ MAX phase which is the first known MAX phase to exhibit twinning on the center M layers of atoms which makes $Mo_4VC_4$ MXene unique from all other known MXenes for two reasons. This new MXene is disordered on the M site as indicated by atomic-resolution EDS. Besides the optimized synthesis method, we present structural, chemical, thermal, optical, and electronic characterization of $Mo_4VAlC_4$ and $Mo_4VC_4$. In addition, DFT results show the great potential for additional $M_5AX4$ phases. Due to their higher thickness. $M_5X_4$ MXenes have the potential to be useful in many applications including, but not limited to, structural materials, optoelectronic devices with high figure of merit, and electronics. $Mo_4VAlC_4$ MAX phase and $Mo_4VC_4$ MXene are the first step into a new territory for the MXene family of 2D nanomaterials.

Table 3. Calculated formation energy (eV/formula unit) and lattice parameters (A) of ordered $M'_4M''AlC_4$ MAX phase compositions

TABLE 3

Calculated formation energy (eV/formula unit) and lattice parameters (Å) of ordered $M'_4M''AlC_4$ MAX phase compositions

| M' | M'' | $a_{ordered}$ | $c_{ordered}$ | $E_{formation}$ |
|----|-----|---------------|---------------|-----------------|
| Sc | Sc | 3.311 | 31.567 | −4.738 |
| Sc | Ti | 3.250 | 31.241 | −7.106 |
| Sc | V | 3.215 | 30.965 | −6.200 |
| Sc | Zr | 3.314 | 31.631 | −8.043 |
| Sc | Nb | 3.263 | 31.404 | −8.144 |
| Sc | Mo | 3.222 | 31.287 | −6.563 |
| Sc | Hf | 3.301 | 31.574 | −8.567 |
| Sc | Ta | 3.256 | 31.417 | −9.134 |
| Sc | W | 3.216 | 31.322 | −6.944 |
| Ti | Ti | 3.087 | 28.518 | −13.552 |
| Ti | Sc | 3.127 | 29.169 | −11.436 |
| Ti | V | 3.062 | 28.166 | −12.025 |
| Ti | Zr | 3.147 | 28.900 | −13.391 |
| Ti | Nb | 3.115 | 28.596 | −12.622 |
| Ti | Mo | 3.075 | 28.674 | −10.600 |
| Ti | Hf | 3.138 | 28.862 | −14.031 |
| Ti | Ta | 3.109 | 28.604 | −13.499 |
| Ti | W | 3.076 | 28.644 | −10.784 |
| V | V | 2.929 | 27.508 | −7.735 |
| V | Sc | 2.993 | 27.923 | −8.163 |
| V | Ti | 2.953 | 27.674 | −9.748 |
| V | Zr | 3.023 | 27.923 | −8.865 |
| V | Nb | 3.007 | 27.714 | −7.410 |
| V | Mo | 2.947 | 28.008 | −5.681 |
| V | Hf | 3.017 | 27.855 | −9.590 |
| V | Ta | 3.010 | 27.601 | −8.170 |
| V | W | 2.955 | 27.985 | −5.425 |
| Zr | Zr | 3.343 | 30.689 | −15.681 |
| Zr | Sc | 3.343 | 30.817 | −13.311 |
| Zr | Ti | 3.299 | 30.203 | −14.499 |
| Zr | V | 3.286 | 29.770 | −12.143 |
| Zr | Nb | 3.312 | 30.319 | −14.100 |
| Zr | Mo | 3.295 | 30.080 | −11.214 |
| Zr | Hf | 3.331 | 30.641 | −16.119 |
| Zr | Ta | 3.301 | 30.366 | −14.664 |
| Zr | W | 3.278 | 30.268 | −11.604 |
| Nb | Nb | 3.158 | 29.627 | −8.919 |
| Nb | Sc | 3.170 | 29.763 | −10.467 |
| Nb | Ti | 3.141 | 29.376 | −10.773 |
| Nb | V | 3.116 | 29.209 | −8.069 |
| Nb | Zr | 3.202 | 29.654 | −11.390 |
| Nb | Mo | 3.139 | 29.475 | −6.668 |
| Nb | Hf | 3.190 | 29.572 | −11.928 |
| Nh | Ta | 3.160 | 29.575 | −9.651 |
| Nb | W | 3.140 | 29.483 | −6.373 |
| Mo | Mo | 3.081 | 28.628 | 0.419 |
| Mo | Sc | 3.134 | 28.763 | −3.987 |
| Mo | Ti | 3.049 | 28.872 | −3.473 |
| Mo | V | 3.000 | 29.038 | −1.328 |
| Mo | Zr | 3.203 | 28.178 | −3.648 |
| Mo | Nb | 3.093 | 28.797 | −1.376 |
| Mo | Hf | 3.192 | 28.182 | −4.117 |
| Mo | Ta | 3.085 | 28.802 | −1.933 |
| Mo | W | 3.074 | 28.680 | 1.063 |
| Hf | Hf | 3.298 | 30.258 | −17.452 |
| Hf | Sc | 3.307 | 30.484 | −14.732 |
| Hf | Ti | 3.260 | 29.919 | −15.961 |
| Hf | V | 3.245 | 29.495 | −13.845 |
| Hf | Zr | 3.307 | 30.358 | −16.970 |
| Hf | Nb | 3.273 | 30.023 | −15.363 |
| Hf | Mo | 3.255 | 29.801 | −12.780 |
| Hf | Ta | 3.263 | 30.071 | −16.141 |
| Hf | W | 3.246 | 29.900 | −12.899 |
| Ta | Ta | 3.134 | 29.490 | −11.489 |
| Ta | Sc | 3.149 | 29.664 | −12.692 |
| Ta | Ti | 3.115 | 29.359 | −12.623 |
| Ta | V | 3.090 | 29.201 | −10.203 |
| Ta | Zr | 3.179 | 29.524 | −13.038 |
| Ta | Nb | 3.133 | 29.593 | −10.841 |

TABLE 3-continued

Calculated formation energy (eV/formula unit) and lattice parameters (Å) of ordered $M'_4M''AlC_4$ MAX phase compositions

| M' | M'' | $a_{ordered}$ | $c_{ordered}$ | $E_{formation}$ |
|----|-----|---------------|---------------|-----------------|
| Ta | Mo | 3.120 | 29.369 | −8.577 |
| Ta | Hf | 3.173 | 29.448 | −13.609 |
| Ta | W | 3.121 | 29.348 | −8.218 |
| W | W | 3.078 | 28.704 | 3.601 |
| W | Sc | 3.125 | 28.848 | −2.124 |
| W | Ti | 3.058 | 28.817 | −1.420 |
| W | V | 3.042 | 28.571 | 0.853 |
| W | Zr | 3.118 | 29.077 | −1.452 |
| W | Nb | 3.095 | 28.880 | 0.855 |
| W | Mo | 3.081 | 28.699 | 2.845 |
| W | Hf | 3.113 | 28.955 | −1.820 |
| W | Ta | 3.084 | 28.891 | 0.413 |

EMBODIMENTS

The following embodiments are exemplary only and do not serve to limit the scope of the present disclosure or of the appended claims Embodiment 1. A composition, comprising:

A composition, comprising:

(a) at least one layer having first and second surfaces, each layer described by a formula $M_5X_4T_x$ and comprising a substantially two-dimensional array of crystal cells, each crystal cell having an empirical formula of $M_5X_4$, such that each X is positioned within an array of M, wherein M is at least one Group HIB, IVB, VB, or VIB metal or a lanthanide, wherein X is C and/or N, and wherein $T_x$ represents optionally present surface termination groups; or (b) at least one layer having first and second surfaces, each layer described by a formula $(M'_aM'_b)X_4T_x$ and comprising a substantially two-dimensional array of crystal cells, each crystal cell having an empirical formula of $(M'_aM''_b)X_4$, such that each X is positioned within an array of M' and M'', wherein M' and M'' are different Group IIIB, IVB, VB, or VIB metals, wherein X is C and/or N, wherein a+b=5, and wherein $T_x$ represents optionally present surface termination groups, or (c) at least one layer having first and second surfaces, each layer described by a formula $(M'_aM''_b)_5X_4T_x$ and comprising a substantially two-dimensional array of crystal cells, each crystal cell having an empirical formula of $(M'_aM''_b)_5X_4$, such that each X is positioned within an array of M' and M'', wherein M' and M'' are different Group IIIB, IVB, VB, or VIB metals, wherein X is C and/or N, wherein a+b=1, and wherein $T_x$ represents optionally present surface termination groups.

A is described as an A-group (mostly IIIA and IVA, or groups 13 and 14) element. Sec, e.g., M. W. Barsoum, et al., "Synthesis and Characterization of a Remarkable Ceramic: $Ti_3SiC_2$," *J. Amer. Ceramics. Soc.*, 79, 1953-1956 (1996); M. W. Barsoum, "The $M_{N+1}AX_N$ Phases: A New Class of Solids: Thermodynamically Stable Nanolaminates," *Progress in Solid State Chemistry,* 28, 201-281 (2000), both of which are incorporated by reference herein. A can be, e.g., Al, Si, P, S, Ga, Ge, As, Cd, In, Sn, Tl, and Pb.

Each of M, M', and M" can independently be at least one Group IIIB (e.g., Sc, Y, La, Ac), Group IVB (Ti, Zr, Hf, Rf), Group Group VB (V, Nb. Ta, Db), or Group VIB (Cr, Mo, W, Sg) metal. For example, M, M', and M" can independently be Cr, Mo, Nb, Ta, Ti, or V, or a combination thereof. Cr, Mo, Nb, Ta, Ti, and V are considered particularly suitable.

Without limitation, example $M_5X_4$ compositions include, e.g., $Cr_5C_4$, $Cr_5N_4$, $Ti_3C_4$, $Ti_5N_4$, $Mo_5C_4$, $Mo_5N_4$, $Nb_5C_4$, $Nb_5N_4$, $V_5C_4$, $V_5N_4$, $Ta_5C_4$, and $Ta_5N_4$.

Other example $(M'_aM"_b)X_4$ (where a+b=5), compositions according to the present disclosure can be, without limitation, $Cr_aMo_bC_4$, $Cr_aMo_bN_4$, $Cr_aNb_bC_4$, $Cr_aNb_bN_4$, $Cr_aTa_bC_4$, $Cr_aTa_bN_4$, $Cr_aTi_3C_4$, $Cr_aTi_bN_4$, $Cr_aV_bC_4$, $Cr_aV_bN_4$, $Mo_aNb_bC_4$, $Mo_aNb_bN_4$, $Mo_aTa_bC_4$, $Mo_aTa_bN_4$, $Mo_aTi_bC_4$, $Mo_aTi_bN_4$, $Mo_aV_bC_4$, $Mo_a\ V_bN_4$, $Nb_aTa_bC_4$, $Nb_aTa_bN_4$, $Nb_aTi_bC_4$, $Nb_aTi_bN_4$, $Nb_aV_bC_4$, $Nb_aV_bN_4$, $Ta_aTi_bC_4$, $Ta_aTi_bN_4$, $Ta_aV_bC_4$, $Ta_aV_bN_4$, $Hf_aSc_bN_4$, $Hf_aSc_bC_4$, $Zr_aTi_bC_4$, $Zr_aTi_bN_4$, $Zr_aTa_bN_4$, $Zr_aTa_bC_4$, $W_aTa_bN_4$, $W_aTa_bC_4$, $W_aTi_bN_4$, $W_aTi_bC_4$, $Y_aTa_bN_4$, $Y_aTa_bC_4$, $Y_aTi_bN_4$, $Y_aTi_bC_4$, $W_aNb_bN_4$, $W_aNb_bC_4$, $W_aV_bN_4$, $W_aV_bC_4$, $Y_aNb_bN_4$, $Y_aNb_bC_4$, $Y_aV_bN_4$, $Y_aV_bC_4$ wherein a+b=5.

Other example $(M'_aM"_b)_5X_4$ (where a+b=1), compositions according to the present disclosure can be, without limitation, $(Cr_aMo_b)_5C_4$, $(Cr_aMo_b)_5N_4$, $(Cr_aNb_b)_5C_4$, $(Cr_aNb_b)_5N_4$, $(Cr_aTa_b)_5C_4$, $(Cr_aTa_b)_5N_4$, $(Cr_aTi_b)_5C_4$, $(Cr_aTi_b)_5N_4$, $(Cr_aV_b)_5C_4$, $(Cr_aV_b)_5N_4$, $(Mo_aNb_b)_5C_4$, $(Mo_aNb_b)_5N_4$, $(Mo_aTa_b)_5C_4$, $(Mo_aTa_b)_5N_4$, $(Mo_aTi_b)_5C_4$, $(Mo_aTi_b)_5N_4$, $(Mo_aV_b)_5C_4$, $(Mo_aV_b)_5N_4$, $(Nb_aTa_b)_5C_4$, $(Nb_aTa_b)_5N_4$, $(Nb_aTi_b)_5C_4$, $(Nb_aTi_b)_5N_4$, $(Nb_aV_b)_5C_4$, $(Nb_aV_b)_5N_4$, $(Ta_aTi_b)_5C_4$, $(Ta_aTi_b)_5N_4$, $(Ta_aV_b)_5C_4$, $(Ta_aV_b)_5\ N_4$, $(Hf_aSc_b)_5N_4$, $(Hf_aSc_b)_5C_4$, $(Zr_aTi_b)_5C_4$, $(Zr_aTi_b)_5N_4$, $(Zr_aTa_b)_5N_4$, $(Zr_aTa_b)_5C_4$, $(W_aTa_b)_5N_4$, $(W_aTa_b)_5C_4$, $(W_aTi_b)_5N_4$, $(W_aTi_b)_5C_4$, $(Y_aTa_b)_5N_4$, $(Y_aTa_b)_5\ C_4$, $(Y_aTi_b)_5N_4$, $(Y_aTi_b)_5C_4$, $(W_aNb_b)_5N_4$, $(W_aNb_b)_5C_4$, $(W_aV_b)_5N_4$, $(W_aV_b)_5C_4$, $(Y_aNb_b)_5N_4$, $(Y_aNb_b)_5C_4$, $(Y_aV_b)_5N_4$, $(Y_aV_b)_5C_4$, wherein a+b=1.

As described elsewhere herein, a and b can each independently be integers, e.g., 1, 2, 3, or 4, such that a+b=5. But this is not a requirement, as the range of compositions available can be seen as extending even further when one considers that each M-atom position within the overall $M_{n+1}X_n$ matrix can be represented by more than one element. That is, one or more type of M-atom can occupy each M-position within the respective matrices. In certain exemplary non-limiting examples, these can be characterized as $(M'_jM"_k)_5X_4$, wherein M' and M" are different metals (which can be of the same group), and j+k=1. As a non-limiting example, such a composition can be $(V_{1/2}Nb_{1/2})_5C_4$ or $(V_{1/3}Nb_{2/3})_5N_4$. Other examples include, e.g., $(Cr_{1/4}Mo_{3/4})_5$ $C_4$, $(Cr_{1/4}Mo_{3/4})_5N_4$, $(Cr_{1/5}Nb_{4/5})_5C_4$, $(Cr_{1/5}Nb_{4/5})_5N_4$, $(Nb_{2/5}Ta_{3/5})_5C_4$, $(Nb_{2/5}Ta_{3/5})_5N_4$, $(Nb_{1/6}Ti_{5/6})_5C_4$, $(Nb_{1/6}Ti_{5/6})_5N_4$, and $(Nb_{1/10}\ V_{9/10})_5C_4$.

Embodiment 2. The composition of Embodiment 1, wherein at least one of the first surface and the second surface comprises surface terminations $T_x$, the surface terminations independently comprising alkoxide, alkyl, carboxylate, halide, hydroxide, hydride, oxide, sub-oxide, nitride, sub-nitride, sulfonate, thiol, or any combination thereof.

Embodiment 3. The composition of any one of Embodiments 1-2, wherein the composition is characterized as a stacked structure comprising a plurality of the layers.

Embodiment 4. The composition of any one of Embodiments 1-2, wherein the composition is characterized as being a solid solution.

Embodiment 5. The composition of any one of Embodiments 1-4, wherein the layer is characterized as comprising 5 atomic layers of M. The layer can have a twinned structure, in some embodiments. In some embodiments, the layer can have a non-twinned structure.

Embodiment 6. The composition of Embodiment 5, wherein the layer is characterized as comprising a twinned structure.

Embodiment 7. The composition of any one of Embodiments 1-6, wherein the composition is characterized as being in flake form. It should be understood that the term "flake" does not require that the composition have irregular borders or define two parallel surfaces; the term also encompasses chips, peels, rods, fragments, and the like.

Embodiment 8. The composition of Embodiment 7, wherein the flake defines a cross-sectional dimension of greater than 1 micrometer ($\mu$m). It should be understood, however, that a flake can define a cross-sectional dimension of less than about 1 micrometer ($\mu$m).

Embodiment 9. The composition of Embodiment 8, wherein the flake defines a cross-sectional dimension of from about 1 to about 10 micrometers.

Embodiment 10. The composition of any one of Embodiments 1-9, wherein a layer defines a thickness of at least about 1 nm.

Embodiment 11. The composition of Embodiment 10, wherein a layer defines a thickness of from about 1 to about 2 nm.

Embodiment 12. A component, the component comprising a composition according to any one of Embodiments 1-11.

Embodiment 13. The component of Embodiment 12, wherein the component is characterized as an optical component, an optomechanical component, a plasmonic component, a signal receiver, a signal transmitter, a fiber, a textile, a radiation shield, or any combination thereof.

Embodiment 14. A component, the component having disposed thereon a coating, the coating comprising a composition according to any one of Embodiments 1-11.

Embodiment 15. A composition, the composition comprising a suspension of a composition according to any one of Embodiments 1-11.

Embodiment 16. A method, the method comprising synthesizing a composition according to any one of Embodiments 1-11.

Embodiment 17. A method, comprising removing the A-group element from a MAX phase material so as to form a product composition having the empirical formula of $M_5X_4(T_x)$ (wherein M is a Group IIIB, IVB, VB, or VIB metal and wherein X is C and/or N); $(M'_aM"_b)AX_4(T_x)$, wherein M' and M" are different Group IIIB, IVB, VB, or VIB metals, wherein a+b=5, and wherein X is C and/or N; or $(M'_aM"_b)_5AX_4$, wherein M' and M" are different Group IIIB, IVB, VB, or VIB metals, wherein a+b=1, and wherein X is C and/or N. Exemplary product compositions are at least those in Embodiments 1-11.

MAX phase materials are themselves known to exist as laminated structures with anisotropic properties. These materials are layered hexagonal (space group P6₃/mmc), with two formula units per unit cell. Near close-packed M-layers are interleaved with pure A-group element layers, with the X-atoms filling the octahedral sites between the former.

Within the MAX phase structure, the $M_{n+1}X_n$ layers are chemically quite stable, possibly owing to the strength of the M-X bond. By comparison, the A-group atoms are the most reactive species, reflective of their relatively weak binding. For example, heating $Ti_3SiC_2$ in a C-rich atmosphere or heating in molten cryolite or molten aluminum is known to result in the loss of Si and the formation of $TiC_x$. In the case of cryolite, the vacancies that form lead to the formation of a partially ordered cubic $TiC_{0.67}$ phase. In both cases, the high temperatures lead to a structural transformation from a hexagonal to a cubic lattice and a partial loss of layering. In some cases, such as $Ti_2InC$, simply heating in vacuum at ~800° C. results in loss of the A-group element and $TiC_x$ formation. Removing of both the M and A elements from MAX structure by high temperature chlorination results in a porous carbon known as carbide derived carbon with useful and unique properties.

Embodiment 18. The method of Embodiment 17, further comprising delaminating layers of the product composition from one another. Delamination can be accomplished by, e.g., sonication, mechanical means, chemical means, and other techniques known to those of ordinary skill in the art.

Embodiment 19. The method of Embodiment 18, further comprising forming a suspension of delaminated layers of the product composition.

Embodiment 20. The method of Embodiment 19, further comprising forming a free-standing structure of the product composition.

Embodiment 21. A composition, (a) the composition characterized as having an empirical formula $M_5AX_4$, wherein M is a Group IIIB, IVB, VB, or VIB metal, and wherein X is C and/or N: or (b) the composition characterized as having an empirical formula $(M'_aM''_b)AX_4$, wherein M' and M" are different Group IIIB, IVB, VB, or VIB metals, wherein a+b=5, and wherein X is C and/or N; or (c) the composition characterized as having an empirical formula $(M'_aM''_b)_5AX_4$, wherein M' and M" are different Group IIIB, IVB, VB, or VIB metals, wherein a+b=1, and wherein X is C and/or N.

Examples of $M_5AX_4$ include, without limitation, $Ti_5AlC_4$, $Nb_5AlC_4$, $Mo_5AlN_4$, $V_5SiC_4$, $V_5GeN_4$, $Ti_5PbC_4$, $Ti_5PbN_4$, $Sc_5AlC_4$, and $Y_5TlC_4$, Examples of $(M'_aM''_b)AX_4$, wherein M' and M" are different Group IIIB, IVB, VB, or VIB metals, wherein a+b=5, and wherein X is C and/or N, include, without limitation, $Cr_1Mo_4AlC_4$, $Cr_1Mo_4AlN_4$, $Cr_2Nb_3TlC_4$, $Cr_2Nb_3TlN_4$, $Cr_1Ta_4GeC_4$, $Cr_1Ta_4GeN_4$, $Cr_2Ti_3SiC_4$, $Cr_2Ti_3SiN_4$, $Cr_2V_3PbC_4$, $Cr_2V_3PbN_4$, $Mo_1Nb_4AlC_4$, $Mo_1Nb_4AlN_4$, $Mo_2Ta_3AlC_4$, $Mo_2Ta_3AlN_4$, $Mo_1Ti_4AlC_4$, and $Mo_1Ti_4AlN_4$.

Examples of $(M'_aM''_b)_5AX_4$, wherein M' and M" are different Group IIIB, IVB, VB, or VIB metals, wherein a+b=1, and wherein X is C and/or N include, without limitation, $(Cr_{1/2}Mo_{1/2})_5AlC_4$, $(Cr_{3/5}Mo_{2/5})_5AlN_4$, $(Cr_{5/6}Nb_{1/6})_5TlC_4$, $(Cr_{1/2}Nb_{1/2})_5TlN_4$, $(Cr_{3/5}Ta_{2/5})_5GeC_4$, $(Cr_{3/5}Ta_{2/5})_5GeN_4$, $(Cr_{1/3}Ti_{2/3})_5SiC_4$, $(Cr_{1/2}Ti_{1/2})_5SiN_4$, $(Cr_{2/3}V_{1/3})_5PbC_4$, $(Cr_{1/2}V_{1/2})_5PbN_4$, $(Mo_{1/5}Nb_{4/5})_5AlC_4$, $(Mo_{1/5}Nb_{4/5})_5AlN_4$, $(Mo_{1/3}Ta_{2/3})_5AlC_4$, $(Mo_{1/3}Ta_{2/3})_5AlN_4$, $(Mo_{1/5}Ti_{4/4})_5AlC_4$, and $(Mo_{1/5}Ti_{4/5})_5AlN_4$.

In some embodiments, M' and M" are from the same group, e.g., both metals are from Group IIB (such as Cr and Mo).

Embodiment 22. The composition of Embodiment 21, wherein A is Al, As, Cd, Ga, Ge, P, Pb, In, S, Sn, or Tl.

Embodiment 23. The composition of any one of Embodiments 21-22, wherein M, M', and M" is independently Cr, Ti, Mo, Nb, V, or Ta, or a combination thereof.

What is claimed:

1. A composition, comprising:

(a) at least one layer having first and second surfaces, each layer described by a formula $M_5X_4T_x$ and comprising a substantially two-dimensional array of crystal cells, each crystal cell having an empirical formula of $M_5X_4$, such that each X is positioned within an array of M, wherein M is at least one Group IIIB, IVB, VB, or VIB metal or a lanthanide, wherein X is C and/or N, and wherein at least one of the first surface and the second surface comprises surface terminations $T_x$, the surface terminations independently comprising alkoxide, alkyl, carboxylate, halide, hydroxide, hydride, oxide, sub-oxide, nitride, sub-nitride, sulfonate, thiol, or any combination thereof; or (b) at least one layer having first and second surfaces, each layer described by a formula $(M'_aM''_b)X_4T_x$ and comprising a substantially two-dimensional array of crystal cells, each crystal cell having an empirical formula of $(M'_aM''_b)X_4$, such that each X is positioned within an array of M' and M", wherein M' and M" are different Group IIIB, IVB, VB, or VIB metals, wherein X is C and/or N, wherein a+b=5, and wherein at least one of the first surface and the second surface comprises surface terminations $T_x$, the surface terminations independently comprising alkoxide, alkyl, carboxylate, halide, hydroxide, hydride, oxide, sub-oxide, nitride, sub-nitride, sulfonate, thiol, or any combination thereof, or (c) at least one layer having first and second surfaces, each layer described by a formula $(M'_aM''_b)_5X_4T_x$ and comprising a substantially two-dimensional array of crystal cells, each crystal cell having an empirical formula of $(M'_aM''_b)_5X_4$, such that each X is positioned within an array of M' and M", wherein M' and M" are different Group IIIB, IVB, VB, or VIB metals, wherein X is C and/or N, wherein a+b=1, and wherein at least one of the first surface and the second surface comprises surface terminations $T_x$, the surface terminations independently comprising alkoxide, alkyl, carboxylate, halide, hydroxide, hydride, oxide, sub-oxide, nitride, sub-nitride, sulfonate, thiol, or any combination thereof.

2. The composition of claim 1, wherein the composition is characterized as a stacked structure comprising a plurality of the layers.

3. A composition, comprising:

(a) at least one layer having first and second surfaces, each layer described by a formula $M_5X_4T_x$ and comprising a substantially two-dimensional array of crystal cells, each crystal cell having an empirical formula of $M_5X_4$, such that each X is positioned within an array of M, wherein M is at least one Group IIIB, IVB, VB, or VIB metal or a lanthanide, wherein X is C and/or N, wherein the composition is characterized as being a solid solution, and wherein $T_x$ represents optionally present surface termination groups; or (b) at least one layer having first and second surfaces, each layer described by a formula $(M'_aM''_b)X_4T_x$ and comprising a substantially two-dimensional array of crystal cells, each crystal cell having an empirical formula of $(M'_aM''_b)X_4$, such that each X is positioned within an array of M' and M'', wherein M' and M'' are different Group IIIB, IVB, VB, or VIB metals, wherein X is C and/or N, wherein a+b=5, wherein the composition is characterized as being a solid solution, and wherein $T_x$ represents optionally present surface termination groups, or (c) at least one layer having first and second surfaces, each layer described by a formula $(M'_aM''_b)_5X_4T_x$ and comprising a substantially two-dimensional array of crystal cells, each crystal cell having an empirical formula of $(M'_aM''_b)_5X_4$, such that each X is positioned within an array of M' and M'', wherein M' and M'' are different Group IIIB, IVB, VB, or VIB metals, wherein X is C and/or N, wherein a+b=1, wherein the composition is characterized as being a solid solution, and wherein $T_x$ represents optionally present surface termination groups.

4. A composition, comprising:

(a) at least one layer having first and second surfaces, each layer described by a formula $M_5X_4T_x$ and comprising a substantially two-dimensional array of crystal cells, each crystal cell having an empirical formula of $M_5X_4$, such that each X is positioned within an array of M, wherein M is at least one Group IIIB, IVB, VB, or VIB metal or a lanthanide, wherein X is C and/or N, wherein the layer is characterized as comprising 5 atomic layers of M, and wherein $T_x$ represents optionally present surface termination groups.

5. The composition of claim 4, wherein the layer is characterized as comprising a twinned structure.

6. A composition, comprising:

(a) at least one layer having first and second surfaces, each layer described by a formula $M_5X_4T_x$ and comprising a substantially two-dimensional array of crystal cells, each crystal cell having an empirical formula of $M_5X_4$, such that each X is positioned within an array of M, wherein M is at least one Group IIIB, IVB, VB, or VIB metal or a lanthanide, wherein X is C and/or N, wherein the composition is characterized as being in flake form, wherein the flake defines a cross-sectional dimension of greater than 1 micrometer, and wherein $T_x$ represents optionally present surface termination groups; or (b) at least one layer having first and second surfaces, each layer described by a formula $(M'_aM''_b)X_4T_x$ and comprising a substantially two-dimensional array of crystal cells, each crystal cell having an empirical formula of $(M'_aM''_b)X_4$, such that each X is positioned within an array of M' and M'', wherein M' and M'' are different Group IIIB, IVB, VB, or VIB metals, wherein X is C and/or N, wherein a+b=5, wherein the composition is characterized as being in flake form, wherein the flake defines a cross-sectional dimension of greater than 1 micrometer, and wherein $T_x$ represents optionally present surface termination groups, or (c) at least one layer having first and second surfaces, each layer described by a formula $(M'_aM''_b)_5X_4T_x$ and comprising a substantially two-dimensional array of crystal cells, each crystal cell having an empirical formula of $(M'_aM''_b)_5X_4$, such that each X is positioned within an array of M' and M'', wherein M' and M'' are different Group IIIB, IVB, VB, or VIB metals, wherein X is C and/or N, wherein a+b=1, wherein the composition is characterized as being in flake form, wherein the flake defines a cross-sectional dimension of greater than 1 micrometer, and wherein $T_x$ represents optionally present surface termination groups.

7. The composition of claim 6, wherein the flake defines a cross-sectional dimension of from about 1 to about 10 micrometers.

8. A composition, comprising:

(a) at least one layer having first and second surfaces, each layer described by a formula $M_5X_4T_x$ and comprising a substantially two-dimensional array of crystal cells, each crystal cell having an empirical formula of $M_5X_4$, such that each X is positioned within an array of M, wherein M is at least one Group IIIB, IVB, VB, or VIB metal or a lanthanide, wherein X is C and/or N, wherein a layer defines a thickness of at least about 1 nm, and wherein $T_x$ represents optionally present surface termination groups; or (b) at least one layer having first and second surfaces, each layer described by a formula $(M'_aM''_b)X_4T_x$ and comprising a substantially two-dimensional array of crystal cells, each crystal cell having an empirical formula of $(M'_aM''_b)X_4$, such that each X is positioned within an array of M' and M'', wherein M' and M'' are different Group IIIB, IVB, VB, or VIB metals, wherein X is C and/or N, wherein a+b=5, wherein a layer defines a thickness of at least about 1 nm, and wherein $T_x$ represents optionally present surface termination groups, or (c) at least one layer having first and second surfaces, each layer described by a formula $(M'_a M''_b)_5 X_4 T_x$ and comprising a substantially two-dimensional array of crystal cells, each crystal cell having an empirical formula of $(M'_a M''_b)_5 X_4$, such that each X is positioned within an array of M' and M", wherein M' and M" are different Group IIIB, IVB, VB, or VIB metals, wherein X is C and/or N, wherein a+b=1, wherein a layer defines a thickness of at least about 1 nm, and wherein $T_x$ represents optionally present surface termination groups.

9. The composition of claim 8, wherein a layer defines a thickness of from about 1 to about 2 nm.

10. A component, the component comprising a composition according to claim 1.

11. The component of claim 10, wherein the component is characterized as an optical component, an optomechanical component, a plasmonic component, a signal receiver, a signal transmitter, a fiber, a textile, a radiation shield, or any combination thereof.

12. A component, the component comprising disposed thereon a coating, the coating comprising a composition according to claim 1.

13. A composition, the composition comprising a suspension of a composition according to claim 1.

14. A method, the method comprising synthesizing a composition according to claim 1.

15. A method, comprising removing the A-group element from a MAX phase material so as to form a product composition according to claim 1.

16. The method of claim 15, further comprising delaminating layers of the product composition from one another.

17. The method of claim 16, further comprising forming a suspension of delaminated layers of the product composition.

18. The method of claim 17, further comprising forming a free-standing structure of the product composition.

* * * * *